US006857796B2

(12) United States Patent
Hatayama

(10) Patent No.: US 6,857,796 B2
(45) Date of Patent: Feb. 22, 2005

(54) PRINTING SYSTEM FOR BOOKBINDING COVER AND BODY PORTIONS

(75) Inventor: Fumihiro Hatayama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/159,124

(22) Filed: Jun. 3, 2002

(65) Prior Publication Data

US 2002/0181985 A1 Dec. 5, 2002

(30) Foreign Application Priority Data

Jun. 5, 2001 (JP) .................................... P2001-169537

(51) Int. Cl.[7] ............................ B41J 5/30; B41J 11/44; G06F 15/00; G06K 15/00

(52) U.S. Cl. ............................ 400/61; 400/76; 400/70; 358/1.6; 358/1.12; 358/1.15

(58) Field of Search ............................ 400/76, 70, 61; 399/382, 82, 84; 358/1.6, 1.15, 1.1, 1.12, 1.13

(56) References Cited

U.S. PATENT DOCUMENTS 4,438,326 A * 3/1984 Uchida ........................ 705/43
5,655,759 A * 8/1997 Perkins et al. ........... 270/52.02
5,735,659 A * 4/1998 Kosasa et al. ................. 412/9
6,041,200 A * 3/2000 Glass et al. ................... 399/82
6,100,994 A * 8/2000 Schliekelmann et al. .. 358/1.15
6,393,232 B1 * 5/2002 Osari et al. .................... 399/82
6,442,368 B1 * 8/2002 Ohtsuka et al. ............. 399/382
6,632,035 B1 * 10/2003 Kawamoto ................... 400/61
2002/0031630 A1 * 3/2002 Rush et al. ................ 428/40.1
2002/0059338 A1 * 5/2002 Nishikawa et al. ......... 707/500

FOREIGN PATENT DOCUMENTS

EP 000864933 A1 * 9/1998 .......... G03G/15/00
EP 001098266 A2 * 10/2000 .......... G06K/15/00
JP 2002-283644 * 3/2001 ............ B41J/21/00

* cited by examiner

*Primary Examiner*—Andrew H. Hirshfeld
*Assistant Examiner*—Wasseem H. Hamdan
(74) *Attorney, Agent, or Firm*—McDermott Will & Emery LLP

(57) ABSTRACT

A printing system is provided with a controller and a printing device that houses sheets of printing paper of a plurality of kinds. The controller has a storing means for storing cover page data used for forming a front cover and a rear cover of a booklet and body page data used for forming a body of the booklet, and, after having set different print formats with respect to the cover page data and body page data, successively outputs the cover page data and the body page data to the printing device. The printing device, with respect to the cover page data and the body page data transmitted from the controller, prints the cover portion and the body portion on sheets of printing paper of different kinds based upon the print formats respectively set. Thus, it is possible to successively supply printed sheets corresponding to the cover portion and the body portion to an automatic bookbinding machine.

8 Claims, 20 Drawing Sheets

| FRONT COVER FORMAT |
|---|
| FRONT COVER TYPE: GLUED-ON COVER<br>DOUBLE-SIDED PRINTING: DOUBLE SIDED<br>PAPER SIZE: A3<br>BINDING: LEFT<br>FRONT COVER VARIABLE PAGE:- |
| BODY FORMAT |
| PAPER SIZE: A4<br>DOUBLE SIDED PRINTING: DOUBLE SIDED<br>STITCHING SETTING: SIDE STITCHING<br>BINDING: LEFT |

NHPD1

| PAPER SURFACE/REAR FACE: SURFACE | |
|---|---|
| PAPER SIZE: A3 | |
| PD1 | |
| offset(210,0) | |
| PDn | |
| offset(0,0) | |

NHPD2

| PAPER SURFACE/REAR FACE: REAR FACE | |
|---|---|
| PAPER SIZE: A3 | |
| PD2 | |
| offset(0,0) | |
| PDn-1 | |
| offset(210,0) | |

FIG. 9

| FRONT COVER FORMAT |
| --- |
| FRONT COVER TYPE: GLUED-ON COVER<br>DOUBLE-SIDED PRINTING: DOUBLE SIDED<br>PAPER SIZE: A3<br>BINDING: LEFT<br>FRONT COVER VARIABLE PAGE: YES<br>VARIABLE PORTION: OUTSIDE OF FRONT COVER<br>VARIABLE PAGE: VPD1<br>⋮<br>VPDm |
| **BODY FORMAT** |
| PAPER SIZE : A4<br>DOUBLE SIDED PRINTING: DOUBLE SIDED<br>STITCHING SETTING: SIDE STITCHING<br>BINDING: LEFT |

| FRONT COVER FORMAT |
|---|
| FRONT COVER TYPE: GLUED-ON COVER<br>DOUBLE-SIDED PRINTING: DOUBLE SIDED<br>PAPER SIZE: A3<br>BINDING: LEFT<br>FRONT COVER VARIABLE PAGE:- |
| BODY FORMAT |
| PAPER SIZE: A4<br>DOUBLE SIDED PRINTING: DOUBLE SIDED<br>STITCHING SETTING: SIDE STITCHING<br>BINDING: LEFT |
| BACK COVER FORMAT |
| INDEPENDENCE: NO<br>BACK COVER VARIABLE PAGE:—<br>BACK WIDTH: 10 (mm) |

| PAPER SURFACE/REAR FACE: SURFACE |
|---|
| PAPER SIZE: A3 |
| PD1<br>offset(215, 0) |
| PDn<br>offset(0, 0) |
| SPD<br>offset(205, 0) |

| PAPER SURFACE/REAR FACE: REAR FACE |
|---|
| PAPER SIZE: A3 |
| PD2<br>offset(0, 0) |
| PDn-1<br>offset(215, 0) |

| |
|---|
| BACK COVER PAGE DATA NAME: SPD1 |
| PAGE SIZE: (10, 297) |
| CHARACTER INFORMATION<br>HOW TO KEEP KISHU DOG |
| CHARACTER SIZE: 10 mm |
| FONT: GOTHIC |

PRINTING SYSTEM FOR BOOKBINDING COVER AND BODY PORTIONS

BACKGROUND OF THE INVENTION

1. Field of the Invention

The present invention relates to a printing system, and more particularly concerns a printing system which can continuously print a cover portion and a body portion.

2. Description of the Background Art

In recent years, in the printing industry, printing machines of a type referred to as a digital printing machine or an on-demand printing machine have been widely used. The digital printing machine is a printing machine which can directly carry out a printing process based upon electronic printing data that has been formed by a conventional Desk Top Publishing (DTP) process. More efficient and labor-saving printing processes have been achieved by introducing such a digital printing machine capable of directly carrying out a printing process based upon electronic printing data to printing processes.

Moreover, in a recently developed technique, with a bookbinding machine being directly connected to a digital printing machine, bending and bookbinding processes are carried out on printed sheets that have been subjected to a printing process by the digital printing machine so that processes up to formation of a booklet are executed more efficiently.

However, even when the automatic binding machine is directly connected to a digital printing machine, it is not easy to form a booklet by using the digital printing machine.

For example, in the case of glued-on cover bookbinding (a booklet in which the front cover and the rear cover are printed on one printing sheet with these being laid on the printing sheet, and the bookbinding is made in a manner so as to wrap the body portion with the sheet), a booklet is constituted by a cover portion consisting of a sheet of paper on which the front cover and the rear cover have been printed and a body portion having a plurality of sheets of paper that forms a booklet main body. When a bookbinding operation of this type is carried out, a printing process for a cover portion and a printing process for a body portion need to be carried out. In the case of a conventional printing process, since the printing processes of the cover portion and the body portion are carried out in respectively independent processes, no problems are raised when a booklet is formed finally through a bookbinding process.

However, in the conventional digital printing machine, since printing data for printing a cover portion and printing data for printing a body portion are managed in a separate manner, the cover portion and the body portion need to be printed in a separated manner. For this reason, even when the automatic bookbinding machine is directly connected to the digital printing machine, sheets of printed paper corresponding to the cover portion and the body portion are not continuously supplied to the automatic binding machine.

Here, although a booklet sometimes needs a back cover, the conventional digital printing machine fails to satisfy this demand.

Moreover, since printing data for printing the cover portion has to formed prior to the printing and bookbinding processes, it is not possible to form booklets in a flexible manner.

SUMMARY OF THE INVENTION

The present invention is directed to a printing system.

In accordance with this invention, the above-mentioned printing system is provided with a) a printing device capable to contain sheets of printing paper of different kinds; and b) a controller for controlling the printing device, comprising page data storing means for storing cover page data defining a cover portion including a front cover and a rear cover of a booklet, and body page data defining a body portion of the booklet; print-format setting means for setting different print formats for the cover page data and body page data, and output means for continuously outputting print data including the cover page data and body page data to the printing device in accordance with the different print formats, wherein the printing device comprises: printing means for continuously inputting the print data from the controller to print the cover portion and the body portion of the booklet in accordance with the different printing formats on the sheets of printing paper of different kinds.

With this arrangement, this printing system makes it possible to continuously supply sheets of printed paper corresponding to the cover portion and the body portion to a bookbinding machine.

In one aspect of the present invention, the print data includes page data of n-pages to-be-printed, where the number "n" is an integer, and the page data storing means stores page data of a leading page as page data for the cover page, page data of a last page as page data for the rear cover page, and page data of rest pages as the body page data.

Thus, it becomes possible to simplify the process for forming the cover portion.

In another aspect of the present invention, the page data storing means further stores a back cover page data defining a back cover portion of the booklet, and the print data further includes the back cover page data.

Thus, with respect to the cover portion including the back cover and the body portion, it is possible to continuously supply sheets of printed paper.

The present invention is also directed to a printing method and a printing program.

Therefore, the objective of the present invention is to provide a printing system which can supply sheets of printed paper corresponding to the cover portion and the body portion continuously to an automatic bookbinding machine.

Still another objective of the present invention is to provide a printing system which, in the case when a booklet requires a back cover, can form printed sheets used for forming a booklet with a front cover and a back cover.

Still another objective of the present invention is to provide a printing system which eliminates the necessity of forming printed data that is used for printing the cover portion prior to printing and bookbinding processes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a drawing that explains the construction of print format information PSD when the content of the cover portion is changed.

DESCRIPTION OF THE PREFERRED EMBODIMENTS

Figure 20A:
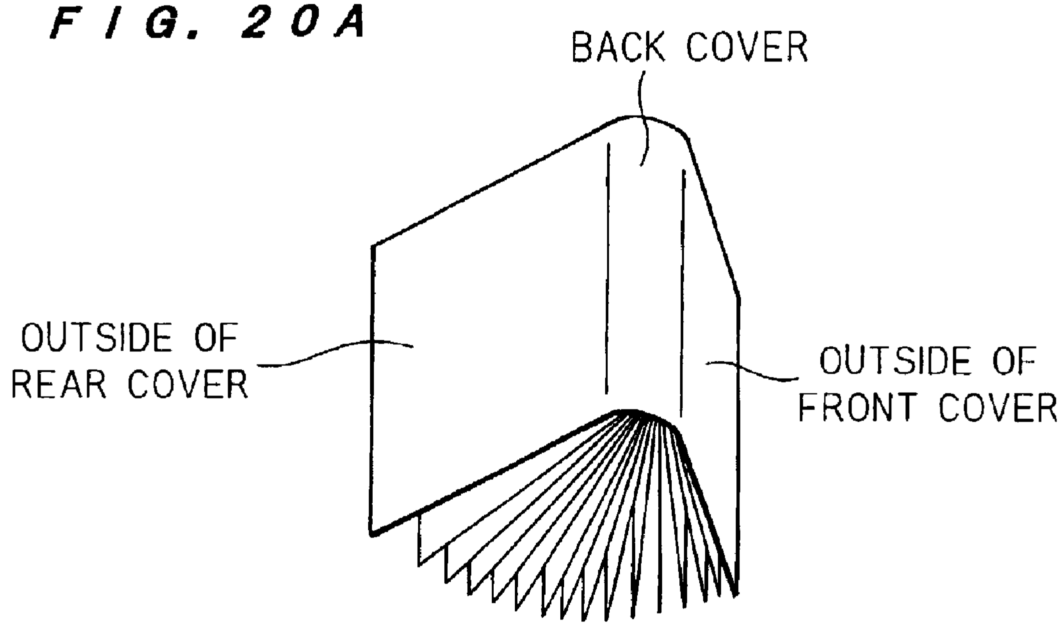
FIGS. 20A and 20B are drawings that show a booklet when viewed from the cover side and the inside.
Figure 20B:
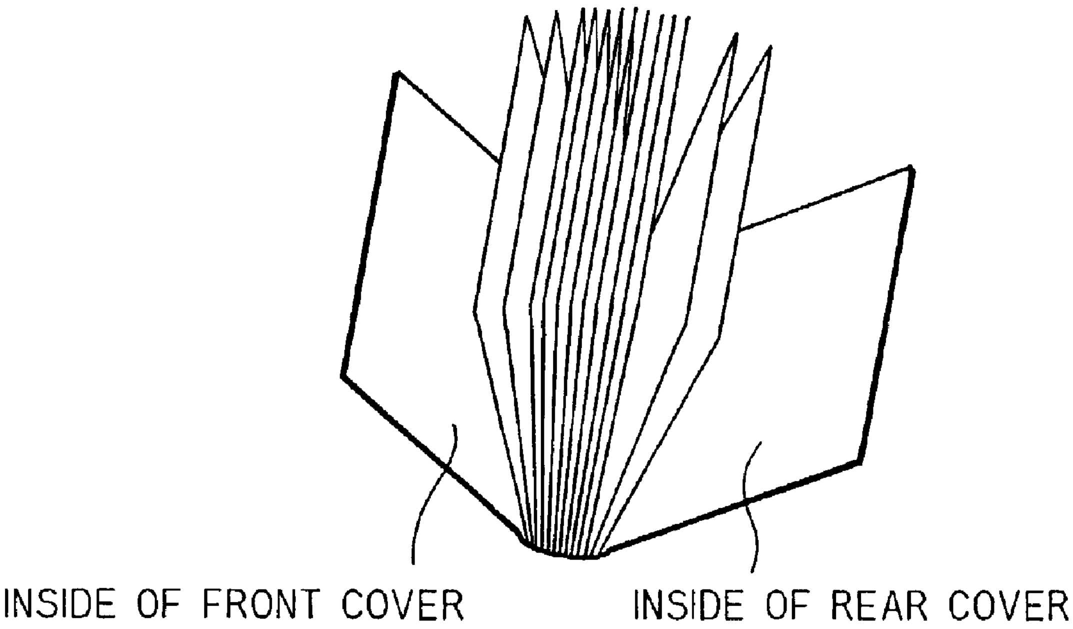

First the following description will discuss definitions of words that are used in the following description. This invention relates to a printing system that is used when a booklet, shown in FIGS. 20A and 20B, is manufactured. FIG. 20A is a drawing that shows a booklet with its face down, which is viewed from the cover side, and FIG. 20B shows a booklet in an opened state, which is viewed from the inside.

Referring to Figures, the following description will discuss preferred embodiments of the present invention in detail. "The outside of the front cover" is a top face of a booklet on which the title of the book and the author's name are written, and the rear face of "the outside of the front cover" corresponds to "an inside of the front cover". Moreover, "an outside of the rear cover" is a face corresponding to the rear side of a booklet on which a price of the book, etc. is placed, and the rear face of "the outside of the rear cover" corresponds to "an inside of the rear cover."

<First Preferred Embodiment>

Figure 1:
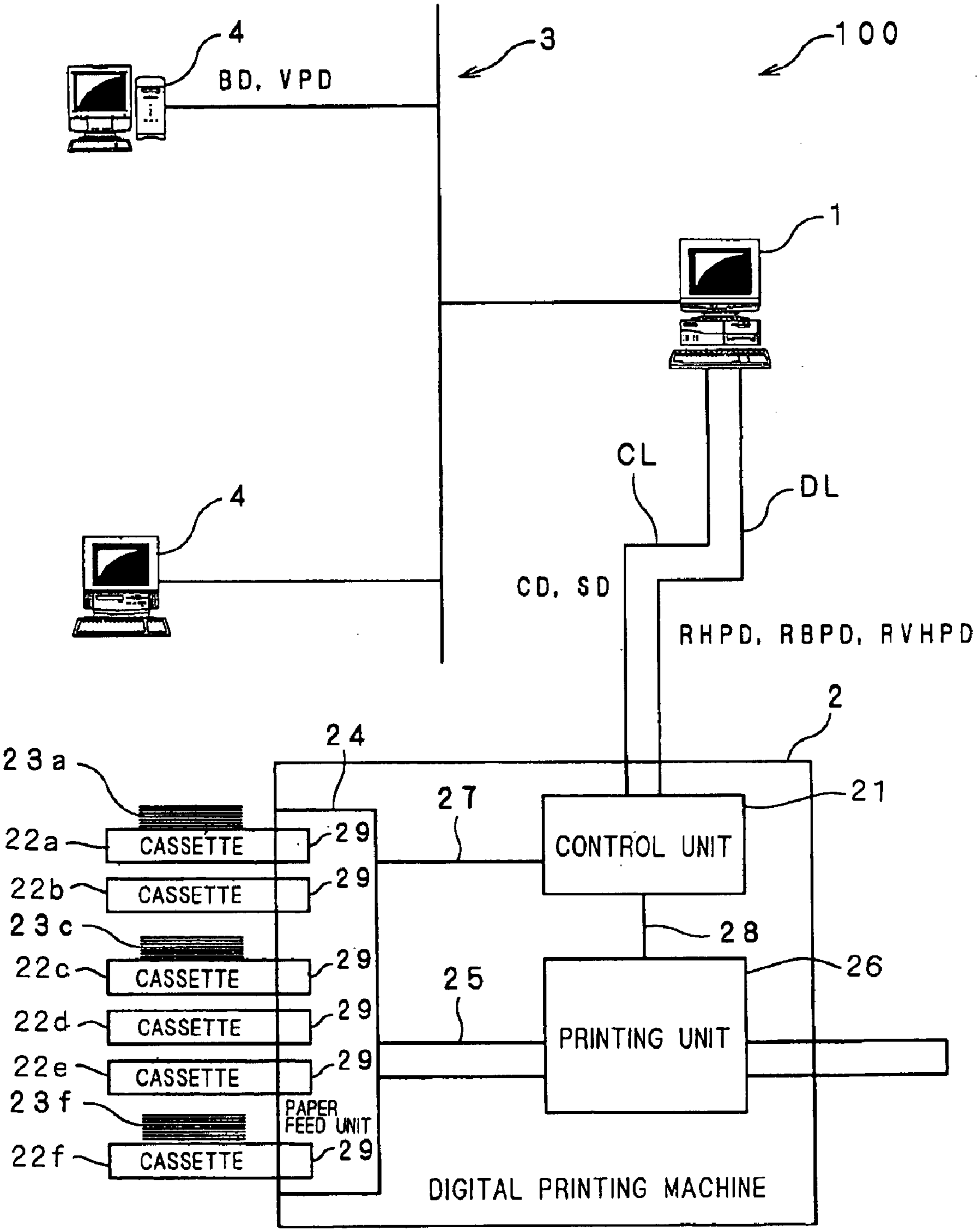
FIG. 1 is a drawing that explains a construction of a printing system 100.

The following description will discuss one embodiment of the present invention. FIG. 1 is a drawing that shows the outline of printing system 100 in which the printing device of the present invention is used. This printing system 100 is constituted by a controller 1, a digital printing machine 2 and an image-processing terminal 4, and controller 1 and image-processing terminal 4 are connected by a network 3. Moreover, controller 1 and digital printing machine 2 are connected by a communication line CL and a communication line DL.

In order to form a booklet consisting of a plurality of pages, image processing terminal 4 makes book data BD in which data of a plurality of pages PD is stored. Image processing terminal 4 makes book data BD having a format such as a page description language, typically represented by PostScript (registered trademark of U.S. Adobe Systems) or a format such as PDF (Portable Document Format). In this case, with respect to a desired front cover of a booklet, the operator of image processing terminal 4 may add page data PD that form the front cover and rear cover to the leading portion and the final portion of book data BD without forming these in a separate manner from the book data BD.

Image processing terminal 4 transmits the book data BD to controller 1 through network 3.

Controller 1 receives the book data BD formed in image processing terminal 4 through network 3. Controller 1 carries out a rasterizing process on the received book data BD. As a result, data of a plurality of pages PD, stored in the book data BD, is converted to a plurality of pieces of printing page data RPD. Controller 1 transmits the pieces of printing page data RPD to digital printing machine 2 connected through a communication line DL.

Digital printing machine 2 carries out a printing process in accordance with control from controller 1. Digital printing machine 2 has a control unit 21, a plurality of paper feed cassettes 22, a paper feed unit 24, a transporting path 25 and a printing unit 26 so as to execute the printing process. Control unit 21 controls the entire digital printing machine 2. Printing page data RPD, transmitted from controller 1 through communication line DL, is received by control unit 21, and a print image, represented by printing page data RPD, is printed in printing unit 26. Moreover, the control data CD, transmitted thereto through communication line CL, is also received by control unit 21 so that paper feed unit 24 is controlled. Moreover, control unit 21 transmits a status signal SD through communication line CL so that a state of digital printing machine 2 is transferred to controller 1.

A plurality of paper feed cassettes 22 are placed in digital printing machine 2. Identifying codes are applied to these paper feed cassettes so that these paper feed cassettes can be identified by controller 1. In FIG. 1, paper feed cassette 22 is constituted by six paper feed cassettes which are respectively provided with identifying codes "22*a*", "22*b*", "22*c*", "22*d*", "22*e*" and "22*f*".

Each of paper feed cassettes 22 houses a plurality of sheets of printing paper 23. Paper feed cassettes 22 can accommodate sheets of printing paper 23 of respectively different kinds, such as plane paper, high-quality paper and sheets of paper having different sizes. FIG. 1 shows a state in which paper feed cassette 22*a* houses printing paper 23*a* of A3 size, paper feed cassette 22*c* houses printing paper 23*c* of A4 size, and paper feed cassette 22*f* houses synthetic paper 23*f* of A4 size with different paper quality. Here, not shown in the Figure, suppose that paper feed cassette 22*b* houses printing paper 23*a*, and paper feed cassettes 22*d*, 22*e* house printing paper 23*c*.

Paper feed unit 24 switches paper feed cassettes 22 in accordance with the control of control unit 21, and supplies sheets of printing paper 23 housed in paper feed cassette 22 to printing unit 26 sheet by sheet. Printing paper 23 supplied from paper feed cassette 22 is transported to printing unit 26 through transporting path 25. Printing unit 26 prints a print image represented by printing page data RPD on a sheet of printing paper 23.

Signal lines 27, 28 are used when control unit 21 controls paper feed unit 24 and printing unit 26. When a paper feed sensor 29 attached to paper feed unit 24 has detected that printing paper 23 housed in paper feed cassette 22 has been used up, or that a paper supplying operation from paper cassette 22 is stopped for any reason signal line 27 is also used so as to inform control unit 21 of the corresponding information. Signal line 28 is used when control signals, printing page data RPD and front cover printing data RHPD from control unit 21 are transmitted to printing unit 26.

Paper feed sensor 29, installed in paper feed unit 24, is attached to each of paper feed cassettes 22. Paper feed sensor 29 is used for detecting the presence or absence of printing paper 23 housed in paper feed cassette 22 or for detecting the fact that the paper feeding operation of printing paper 23 from the corresponding paper feed cassette 22 is not available for any reason.

Figure 2:
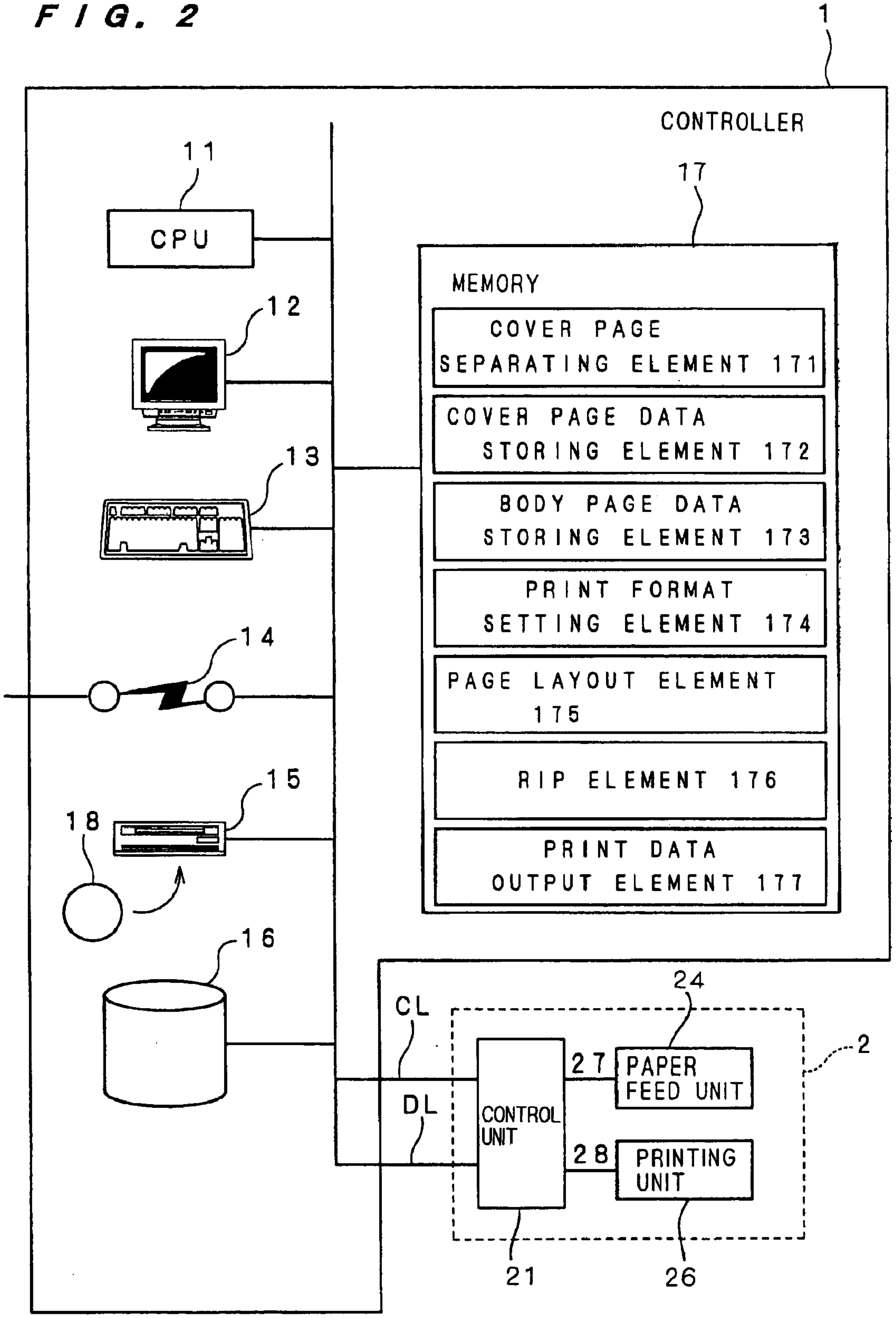
FIG. 2 is a drawing that explains a construction of a controller 1.

FIG. 2 is a drawing that shows the construction of controller 1. Controller 1, which is a generally-used personal computer, is constituted by a CPU 11, a display unit 12, an input unit 13, a network I/F 14, a media drive 15, a memory unit 16, a memory 17 and communication lines CL, DL. CPU 11 controls the entire controller 1, and in particular, achieves functions of controller 1 by executing programs recorded in a media disk 18 inserted in media drive 15 on memory 17. Display unit 12 displays information required for the operation of controller 1. Input unit 13, which is constituted by a mouse, a keyboard, etc., is used for inputting instructions from the operator to controller 1. Network I/F 14 is used for connecting controller 1 to network 3. Controller 1 receives book data BD from an image processing terminal 4 connected to network 3 through network I/F 14. Moreover, it is possible to download programs that achieve functions of controller 1 from a server, not shown. Moreover, in the case when digital printing machine 2 is connected to controller 1 through network 3, printing data RPD and a control signal CD are transmitted to digital printing machine 2 through network I/F 14 and a status signal SD transmitted from digital printing machine 2 is received. Media drive 15 is used for reading programs recorded in media disk 18. The programs read from media drive 15 achieve the functions of controller 1. Moreover, in the case when controller 1 is operated in an off-line state from image processing terminal 4, book data BD, formed in image processing terminal 4, is recorded in media disk 18 so that the succeeding processes may be executed by reading media disk 18 through this media drive 15. Memory unit 16 stores programs read by media drive 15. Moreover, memory unit 16 stores book data BD, front cover printing data RHPD and body printing data RBPD. Communication line CL, which is connected to digital printing machine 2, is used for transmitting control signal CD, in particular, to digital printing machine 2, and for receiving status signal SD transmitted from digital printing machine 2. Communication line DL, which is connected to digital printing machine 2, is used for transmitting, in particular, printing data RPD. Here, communication lines CL and DL may be achieved by a single communication line.

Memory 17 forms a work area on which CPU 11 executes programs stored in memory unit 16. After programs have been executed by CPU 11, the following functions are achieved in memory 17: a cover page data separating element 171, a cover page data storing element 172, a body page data storing element 173, a printing format setting element 174, a page layout element 175, a Rasterized Image Processing (RIP) element 176 and a printing data output element 177. In other words, these functions are functions that are realized when programs utilize hardware resources such as CPU 11 and memory 17.

Cover page data separating element 171 analyzes book data BD transmitted from image processing terminal 4, and separates page data PD corresponding to a front cover and a rear cover from book data BD as cover page data HPD. Here, cover page data separating element 171 separates page data PD1 which is located at a leading portion, that is, a first page, from data of a plurality of pages PD stored in book data BD, as page data corresponding to the front cover. Moreover, it also separates the final portion of data of a plurality of pages PD stored in book data BD, that is, page data PDn corresponding to n-numbered page in the case when n-number of page data PD are stored, as page data corresponding to a rear cover.

Alternatively, in the case of double-sided printing process of a cover portion, in accordance with the facts that the first page forms the outside of the front cover, the second page forms the inside of the front cover, n−1-th page forms the inside of the rear cover and n-th page forms the outside of the rear cover, cover page data separating element 171 separates page data PD1, PD2 corresponding to the first and second pages as page data corresponding to the front cover, and also separates page data PDn−1, PDn corresponding to the n−1-th page and the n-th page as page data corresponding to the rear cover, from data of a plurality of pages PD stored in book data BD.

Cover page data storing element 172 stores page data PD separated by cover page data separating element 171 as cover page data HPD. Cover page data storing element 172 stores page data PD1 and page data PDn or a combination of page data PD1 and PD2, and page data PDn−1 and PDn separated by cover page data separating element 171, as cover page data HPD.

Body page data storing element 173 stores page data PD that is the rest of data after separation of cover page data HPD by cover page data separating element 171. For example, in the case when page data PD1 and page data PDn are separated by cover page data separating element 171 as cover page data HPD, body page data storing element 173 stores page data other than those stored in book data BD, that is, page data PD2 to PDn−1, as body page data BPD. Moreover, in the case when page data PD1, PD2 and page data PDn−1, PDn have been separated as cover page data HPD, body page data storing element 173 stores page data other than those stored in book data BD, that is, page data PD3 to PDn−2, as body page data BPD.

Here, cover page data storing element 172 and body page data storing element 173 may be formed on memory unit 16.

Print format setting element 174 carries out setting of print formats with respect to front page data HPD and body page data BPD respectively. In booklets, print formats are normally different between the cover portion and the body portion. For example, in some cases, the cover portion is formed through a single-sided printing process (with blank pages as the inside of the front cover and the inside of the rear cover) while the body portion is formed through a double-sided printing process, or in the case of glued-on cover bookbinding, the paper size of the body portion is set to A4, while the paper size of the cover portion needs to be set to A3. Therefore, print format setting element 174 sets a print format suitable for the cover portion with respect to cover page data HPD, and also sets a print format suitable for the body portion with respect to body page data BPD so that print format information PSD is prepared. With this arrangement, printing processes respectively suitable for the cover portion and the body portion can be successively carried out during a printing process by digital printing machine 2, which will be described later.

Based upon print format information PSD formed in print format setting element 174, page layout element 175 carries out a re-layout of cover page data HPD. In the case when the front cover print format for carrying out the glued-on cover bookbinding process is set in print format setting element 174, a cover portion, formed by printing a front cover and a rear cover on one sheet of print paper, is required. In order to prepare such a cover portion, page layout element 175 reads cover page data HPD from cover page data storing element 172, and forms laid-out cover page data NHPD in which cover page data HPD is placed so as to achieve the mode of the front cover set by print format information PDS.

Moreover, when an alteration in the contents of the cover page is set in print format information PSD, page layout element 175 substitutes cover page data HPD with front cover altering page data VPD to form variable cover page data of a plurality of pages VHPD. Here, the alteration of the contents of front cover refers to formation of booklets of a plurality of kinds having different front covers. Moreover, as will be described later, it is possible to carry out different setting for each of booklets with respect to the rear cover.

RIP element 176 carries out rasterizing processes on cover page data HPD or laid-out page data NHPD or variable cover page data VHPD and body page data BPD. RIP element 175 carries out the rasterizing processes on cover page data HPD or laid-out page data NHPD or variable cover page data VHPD and body page data BPD so that front cover printing data RHPD or variable front cover printing data RVHPD and body printing data RBPD, which are binary bit-map data that can be printed by digital printing machine 2, are formed.

The front cover printing data RHPD or variable front cover printing data RVHPD and body printing data RBPD, thus formed, are temporarily stored in memory unit 16.

Printing data output element 177 is used for outputting print data including the front cover printing data RHPD or variable front cover printing data RVHPD and body printing data RBPD that are formed in RIP element 176 to digital printing machine 2. In the case when printed paper is supplied to the automatic bookbinding machine to carry out a bookbinding process, the bookbinding process is not carried out properly without successively supplying the cover portion and the body portion thereto. Therefore, printing data outputting element 176 successively outputs the front cover printing data RHPD or variable front cover printing data RVHPD and body printing data RBPD to digital printing machine 2 through communication line DL. Moreover, printing data output element 177 outputs print format information PSD respectively set in cover page data HPD and body page data BPD by print format setting element 174 to digital printing machine 2 through communication line CL. Thus, in digital printing machine 2, at the time of printing the front cover printing data RHPD or variable front cover printing data RVHPD, the printing operation is carried out by using the print format set for front page data HPD, and at the time of printing the body printing data RBPD, the printing operation is carried out by using the print format set for the body page data BPD, respectively; therefore, it is possible to execute printing operations for forming printed paper that can be supplied to the automatic bookbinding machine.

Figure 3:
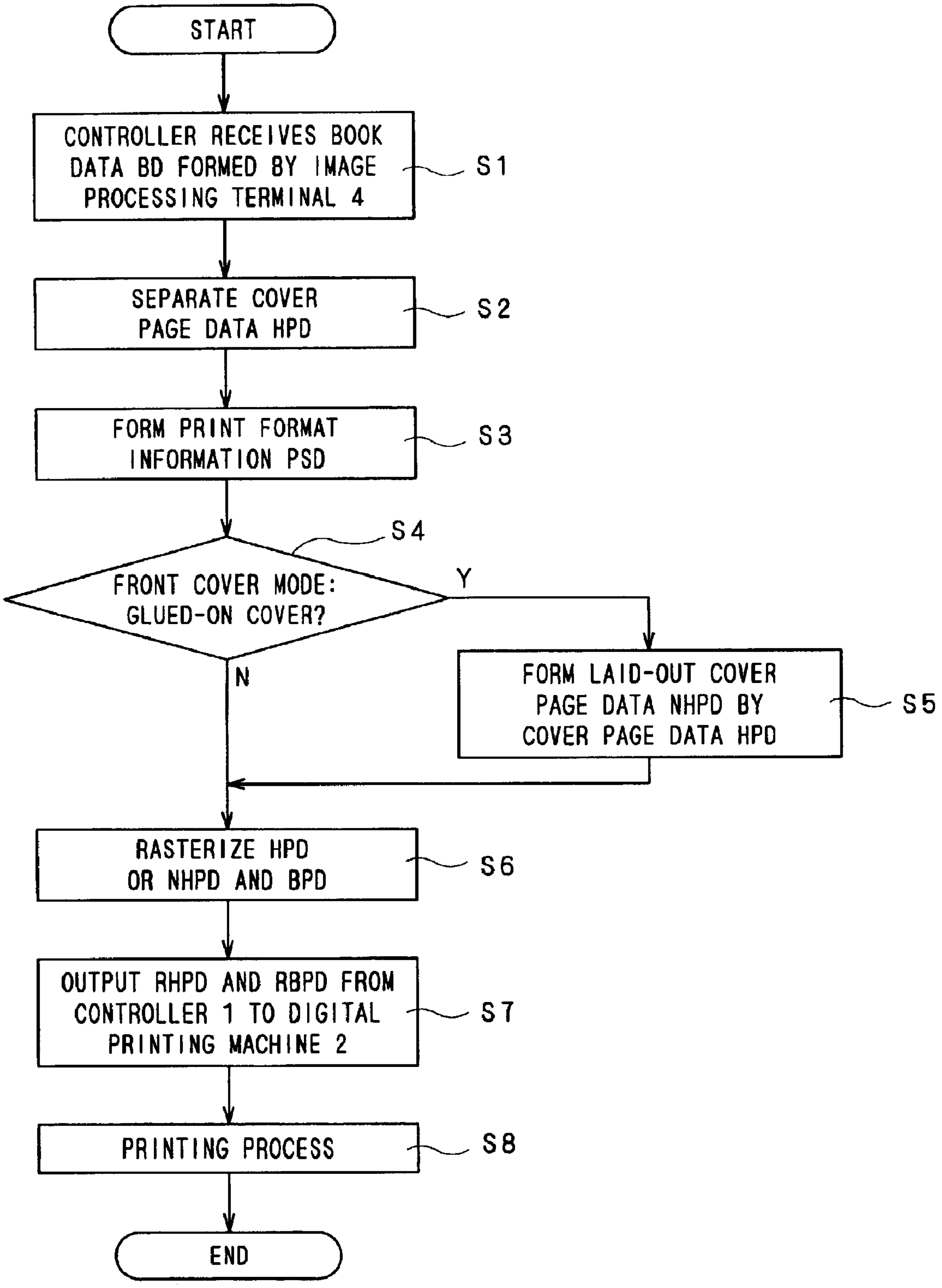
FIG. 3 is a flow chart that explains an operation of printing system 100.

FIG. 3 is a flow chart that explains the operation of printing system 100.

First, at step S1, book data BD containing page data PD that correspond to a plurality of pages for forming a booklet is created in image processing terminal 4, and transmitted to controller 1. The operator of image processing terminal 4 forms n-pieces of page data PD that represents respective pages of a booklet by operating application software, not shown, and prepares book data BD that constitutes a booklet by using these pieces of page data PD. Here, with respect to page data PD1 corresponding to the first page of the booklet and page data PDn corresponding to the final page, it is preferable to form these so as to form the cover portion. The operator of image processing terminal 4 transmits the book data BD thus formed to controller 1 through network 3.

Controller 1 receives the book data BD through network I/F unit 14, and stores the data in memory unit 16.

At step S2, cover page data separating element 171 of controller 1 separates cover page data HPD from the book data BD. The operator of controller 1 allows cover page data separating element 171 to read book data BD stored in memory unit 16 so that the cover page data HPD is separated from pieces of page data PD stored in book data BD.

Figure 4A:
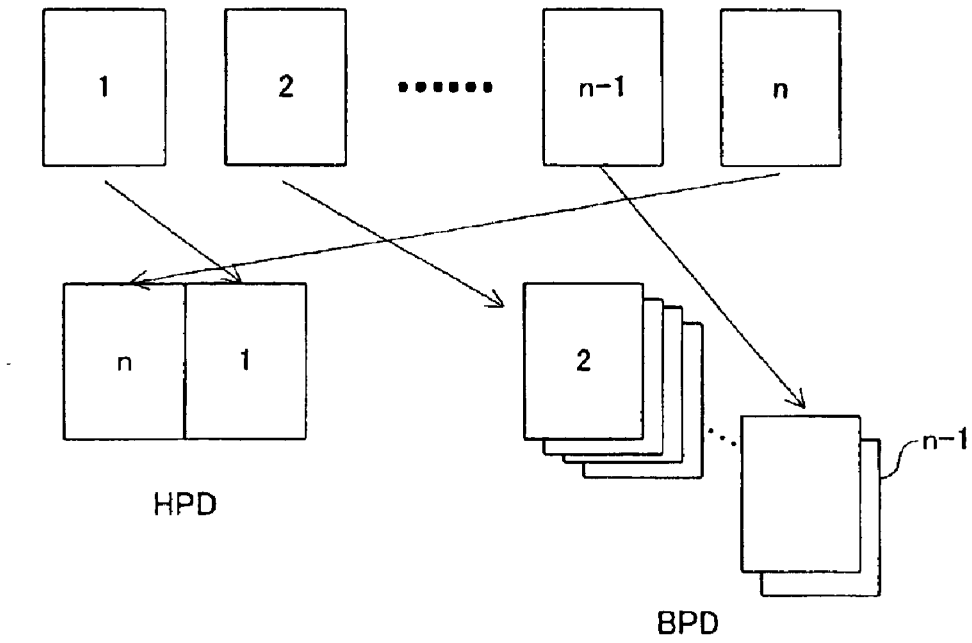
FIGS. 4A to 4B are drawings that explain a construction of page data PD used for forming a cover portion.

In this case, the operator of controller 1 makes a determination as to whether the cover portion is formed by a single-sided printing operation or a double-sided printing operation so that page data PD to be separated as the cover page data HPD is determined. As shown in FIG. 4A, in the case when the cover portion is formed by a single-sided printing process, page data PD required for the cover portion forms page data constituting the outside of the front cover and the outside of the rear cover, and the page data PD1 that corresponds to the leading portion, that is, the first page, and the page data PDn that corresponds to the final portion, that is, the n-th page, are separated by cover page data separating element 171 as cover page data HPD.

Figure 4B:
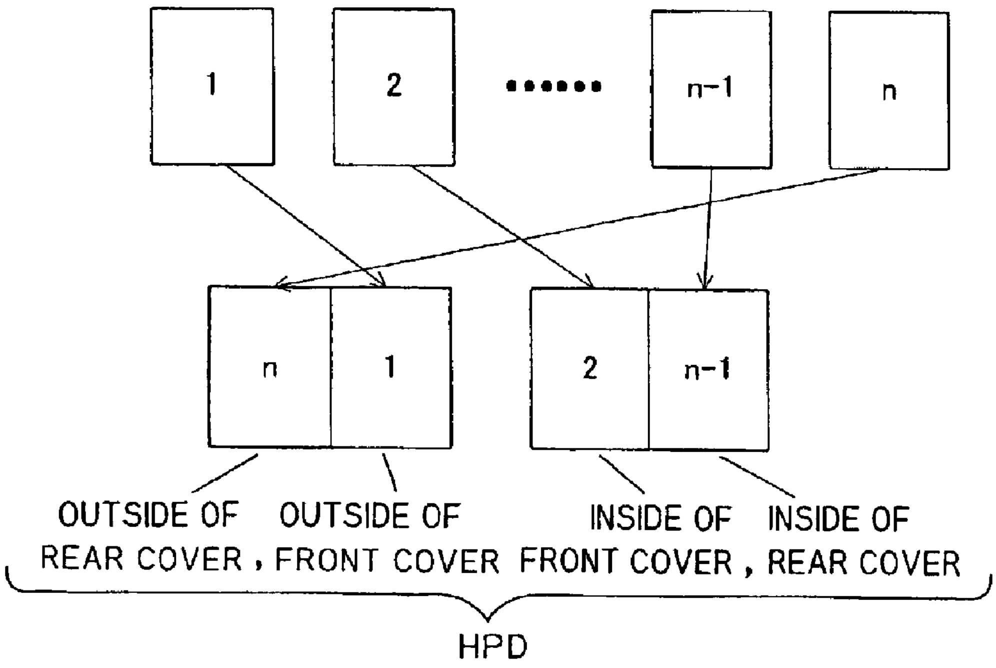

Here, as shown in FIG. 4B, in the case when the cover portion is formed by a double-sided printing process, the page data PD required for the cover portion corresponds to page data that constitutes the outside of the front cover and the inside of the front cover as well as the inside of the rear cover and the outside of the rear cover, and page data PD1 and PD2, which correspond to the first page and the second page, is separated by cover page data separating element 171 as the outside of the front cover and the inside of the front cover. Moreover, the page data PDn−1 and PDn, which correspond to the n−1-th page and the n-th page, are separated by cover page data separating element 171 as the inside of the rear cover and the outside of the rear cover.

The cover page data HPD, separated by cover page data separating element 171, is stored in cover page data storing element 172. Page data PD other than this page data is stored in body page data storing element 173 as body page data BPD.

Figures 5A, 5B:
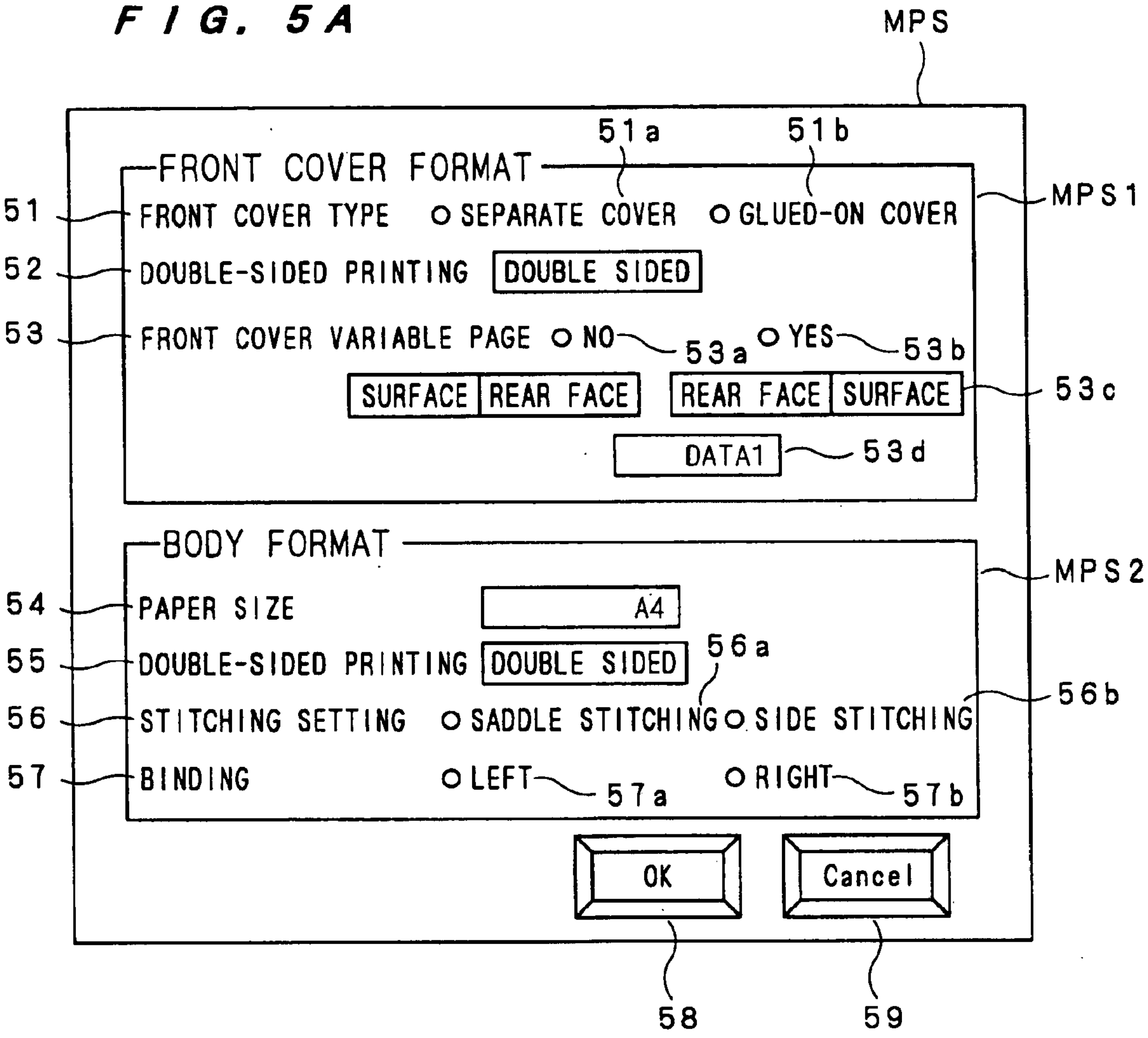
FIGS. 5A to 5B are drawings that explain a print format setting menu MPS and a construction of print format information PSD.

At step S3, printing format setting element 174 sets print formats for cover page data HPD and body page data BPD respectively. FIG. 5A shows a print format setting menu MPS that is displayed on display unit 12 by print format setting element 174 so as to allow the operator of controller 1 to set print formats with respect to cover page data HPD and body page data BPD respectively.

Print format setting menu MPS is provided with a front cover format setting frame MPS1 and a body format setting frame MPS2.

Front cover format setting frame MPS1 is provided with a front cover type input frame 51, a double-sided printing execution display frame 52 and a cover page variable setting frame 53.

Moreover, body format setting frame MPS2 is provided with a paper size setting frame 54, a double-sided printing setting frame 55, a binding setting frame 56 and a binding direction setting frame 57.

Furthermore, print format setting menu MPS is provided with an OK button 58 and a cancel button 59.

Front cover type input frame 51, provided in front cover format setting frame MPS1, is used for setting the type of front cover of a booklet. Front cover type input frame 51 is provided with a separate cover button 51*a* and a glued-on cover button 51*b*. This separate cover button 51*a* sets the front cover paper size as the same as the paper size of the body and cover page data HPD is printed on respective sheets of paper as a front cover and a rear cover. In the case of glued-on cover button 51*b*, the front cover paper size is set to not more than twice the paper size of the body, and cover page data HPD is laid the area on a sheet of paper having this paper size, and printed thereon. The operator of controller 1 operates input unit 13 to press either of separate cover button 51*a* or glued-on cover button 51*b* so that the type of front cover in the front cover format is set. Here, separate cover button 51*a* and glued-on cover button 51*b* are exclusively specified, and it is not possible to press the two buttons simultaneously.

A double-sided printing execution display column 52 is used for indicating that the double-sided printing process is available by using cover page data HPD with respect to the front cover of a booklet. In the case when "Double-sided printing" is displayed in double-sided printing execution display column 52, print images derived from cover page data HPD stored in cover page data storing element 172 are printed on the double side of the front cover and the double side of the rear cover respectively. When no specific display is placed on the double-sided printing execution display frame 52, print images derived from cover page data HPD stored in cover page data storing element 172 are printed on the surfaces of the front cover and the rear cover.

Here, double-sided printing execution display column 52 may be designed so that the operator of controller 1 operates input unit 13 to change from "double-sided printing" to "single-sided printing" or from "single-sided printing" to "double-sided printing". In the case when the change from "double-sided printing" to "single-sided printing" is specified by the operator of controller 1, the acquiring process of cover page data HPD from book data BD is re-tried by cover page data separating element 171 so that page data PD1 corresponding to the first page and page data PDn corresponding to n-th page are again stored in cover page data storing element 172 as cover page data HPD. In contrast, in the case when the change from "single-sided printing" to "double-sided printing" is specified, cover page data separating element 171 separates page data PD1, PD2 corresponding to first page and second page as well as page data PDn−1, PDn corresponding to the n−1-th page and the n-th page are separated from book data BD, and stored again in cover page data storing element 172 as cover page data HPD.

Front cover page variable setting frame 53 sets a process for changing the contents of cover page data HPD and for carrying out the resulting printing process. This process will be described later.

Moreover, with respect to the opening direction of the cover portion, it is determined based upon the opening direction set by binding direction setting frame 57 of body format setting frame MPS2.

Paper size setting frame 54, placed in body format setting frame MPS2, is used for setting the size of printing paper on which print images of body page data BPD corresponding to the body of a booklet are printed. Moreover, the paper size set here is associated with the size of printing paper used for printing the front cover. The operator of controller 1 operates input unit 13 so that a desired size is inputted to paper size setting frame 54 with respect to the printing paper size of the body. Here, the paper size, set when book data BD has been formed in image-processing terminal 4, as it is, may be continuously used as the printing paper size of the body.

Double-sided printing setting frame 55 is used for setting a mode in which, with respect to the body of a booklet, body page data BPD is printed on both of the sides of printing paper. When "double-sided printing" is inputted in double-sided printing setting frame 55 by the operator of controller 1, the printing operation is set so that body page data BPD is printed on both of the sides on printing paper. Moreover, when "single-sided printing" is inputted, the printing operation is set so that body page data BPD is printed on a single side of printing paper.

Binding setting frame 56 is used for setting a mode of binding the body of a booklet. Binding setting frame 56 is provided with a saddle stitching set button 56*a* and a side stitching set button 56*b*, and when the operator of controller 1 operates input unit 13 to press either of the abovementioned buttons so that a stitching mode is set. When the operator of controller 1 presses saddle stitching set button 56*a*, the page alignment of body page data BPD is set so that the saddle stitching operation can be carried out with respect to the body of the booklet. When the operator of controller 1 presses side stitching set button 56*b*, the page alignment of body page data BPD is set so that the side stitching operation can be carried out with respect to the body of the booklet. Here, the saddle stitching set button 56*a* and the side stitching set button 56*c* are exclusively specified, and it is not possible to simultaneously press both of the buttons.

Binding direction setting frame 57 is used for setting the binding direction of a booklet. The binding direction refers to a direction in which pages of the booklet are turned, and in the case of a lateral setting of characters in the body text, the left-bound (in which pages are turned in the left direction) is used while in the case of a longitudinal setting of characters in the body text, the right-bound (in which pages are turned in the right direction). Here, in the case of English characters, the body text characters are normally set laterally with the booklet having the left-bound; however, in Japanese sentences, etc., the characters are sometimes set longitudinally with the booklet having the right-bound. The binding position and the alignment of pages of the body is determined depending on the stitching direction. Binding direction setting frame 57 is provided with a left-bound button 57*a* and a right-bound button 57*b* so as to set the binding direction. When the operator of controller 1 operates input unit 13 to press left-bound button 57*a*, the binding direction of the body is set as the left-bound. In contrast, when the right-bound button 57*b* is pressed, the binding direction of the body is set as the right-bound. Moreover, the binding direction, set in the binding direction setting frame 57, is also reflected to the binding direction of the cover portion.

Here, left-bound button 57*a* and right-bound button 57*b* are exclusively specified, and it is not possible to press both of the buttons simultaneously.

After carrying out inputting operations respectively to front cover print format setting frame MPS1 and body print format frame MPS2, the operator of controller 1 presses an OK button 58, thereby completing print format setting menu MPS. Based upon the contents of the inputs given through print format setting menu MPS, print format setting element 174 forms print format information PSD. In the case when the print format setting is terminated in the middle of the process, a cancel button 59 is pressed, thereby completing print format setting menu MPS.

FIG. 5B is a drawing that explains a construction of print format information PSD formed by print format setting element 174.

With respect to "front cover type", "double-sided printing", "paper size", "binding direction" and "variable cover page", settings, respectively given through front cover print format setting frame MPS1, are stored as front cover format information. Here, it is assumed that the "glued-on cover" is set with respect to the "front cover type", the "double-sided printing process" is set with respect to the "double-sided printing" and "A3" is set with respect to the "paper size" in accordance with body format setting, which will be described later. Moreover, it is also assumed that "left-bound" is set in accordance with the body format setting which will be described later. With respect to the "variable cover page", the description thereof will be given later, and in this case, it is assumed that this is not set.

With respect to the "paper size", "double-sided printing", "binding setting" and "binding direction", settings, given through body print format setting frame MPS2, are stored as body format information. Here, with respect to the "paper size", it is assumed that "A4" is set. This setting of the "paper size" is also reflected to the "paper size" in the front cover format information. Moreover, it is assumed that the "double-sided printing process" is set with respect to the "double-sided printing" and "side stitching" is set with respect to the "binding setting". Moreover, it is assumed that the "left-bound" is set with respect to the "binding direction".

In this case, with respect to "stitching setting" and "binding direction", format information setting element 174 also applies the settings stored in the body format information to the front cover format information; therefore, it is not necessary to set "stitching setting" and "binding direction" in the front cover format setting.

The print format information PSD thus formed is used as control information for controlling digital printing machine 2 in steps which will be described later.

At step S4, a determination is made with respect the front cover print format. Here, when "glued-on cover" is set as "front cover type", the sequence proceeds to step S5. When "separate cover" is set as "front cover type", the sequence proceeds to step S6.

At step S5, in order to form a front cover for glued-on cover book binding, page layout element 175 reads cover page data HPD from cover page data storing element 172, and lays the area of page data PD constituting the cover page data HPD on a printing sheet while referring to front cover format information stored in print format information PSD formed at step S3; thus, laid-out cover page data NHPD is formed.

Figures 6A, 6B, 6C:
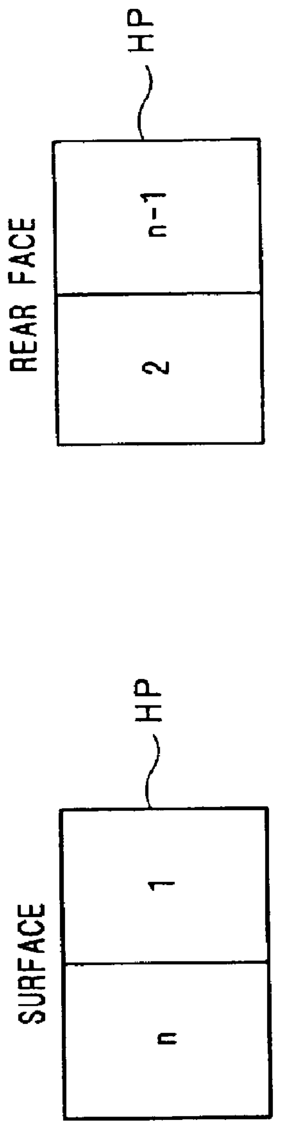
FIGS. 6A to 6C are drawings that explain a construction of cover page data NHPD that has been laid out.

FIGS. 6A to 6C are drawings that show the laid-out cover page data NHPD. Page layout element 175 forms the laid-out cover page data NHPD while referring to the front cover format information. In order to form front cover printing paper HP as shown in FIG. 6A, based upon front cover format information of print format information PSD shown in FIG. 5B, page layout element 175 forms laid-out cover page data NHPD as shown in FIGS. 6B and 6C.

FIG. 6B is a drawing that explains the construction of laid-out cover page data NHPD1 used for printing on the surface of a front cover printing sheet HP. The laid-out cover page data NHPD1 includes information related to "the surface or rear face of paper", "paper size" and cover page data HPD to be laid out. Here, with respect to "the surface or rear face of paper", "surface" is stored since printing is carried out on the surface of the front cover printing sheet HP, and with respect to the "paper size", "A3" is stored. This is because "A4" is set as the body paper size from the body format information and because the paper size of front cover printing paper HP requires not less than twice the size thereof. Moreover, with respect to cover page data HPD to be laid out, since page data PD1 corresponding to the first page and page data PDn corresponding to the n-th page are laid out on the surface of the front cover printing paper HP, "PD1" and "PDn" are respectively stored, and "offset=(210, 0)" and "offset=(0,0)" are respectively added thereto as the layout positions of page data PD. Here, the left below apex of the front cover printing paper HP is set as the origin, and the left blow point from the apex of a print image of each piece of page data PD is determined as a layout position of page data PD.

In the same manner, FIG. 6C is a drawing that shows the construction of laid-out cover page data NHPD2 used for printing on the rear face of the front cover printing sheet HP, and with respect to "the surface or rear face of paper", "rear face" is stored, with respect to the "paper size", "A3" is stored, and with respect to cover page data HPD to be laid out, "PD2" and "PDn−1" are stored, with "offset=(0, 0)" and "offset=(210, 0)" being attached thereto as page layout positions.

The laid-out page data NHPD, formed by page layout element 175 in this manner, is temporarily stored in memory unit 16.

Here, without directly storing the cover page data HPD in the laid-out cover page data NHPD, the laid-out cover page data NHPD and the cover page data HPD may be associated with each other through link information.

At step S6, RIP element 176 carries out rasterizing processes on cover page data HPD or laid-out cover page data NHPD and body page data BPD so that front cover printing data RHPD and body printing data RBPD are formed. The page data PD, formed by image processing terminal 4 and stored in book data BD, is a script-format file written in a page description language, and even if this is used as it is, it is not possible to carry out a printing operation by using digital printing machine 2. Therefore, RIP element 176 carries out rasterizing processes on cover page data HPD separated from book data BD and laid-out cover page data NHPD formed from cover page data HPD and body page data BPD respectively to form front cover print data RHPD and body printing data RBPD having binary bitmap format that can be printed by a digital printing machine 2.

Front cover printing data RHPD and body printing data RBPD, formed in RIP element 176, are stored in memory unit 16.

At step S7, printing data output element 177 outputs the print data including the front cover printing data RHPD and body printing data RBPD to digital printing machine 2 through communication line DL. In this case, print data output element 177 successively outputs the front cover printing data RHPD and the body printing data RBPD to digital printing machine 2, while referring to print format information PDS formed in print format setting element 174. Moreover, printing data output element 177 outputs print format information PSD to digital printing machine 2 so as to control digital printing machine 2 through communication line CL.

Figure 7A:
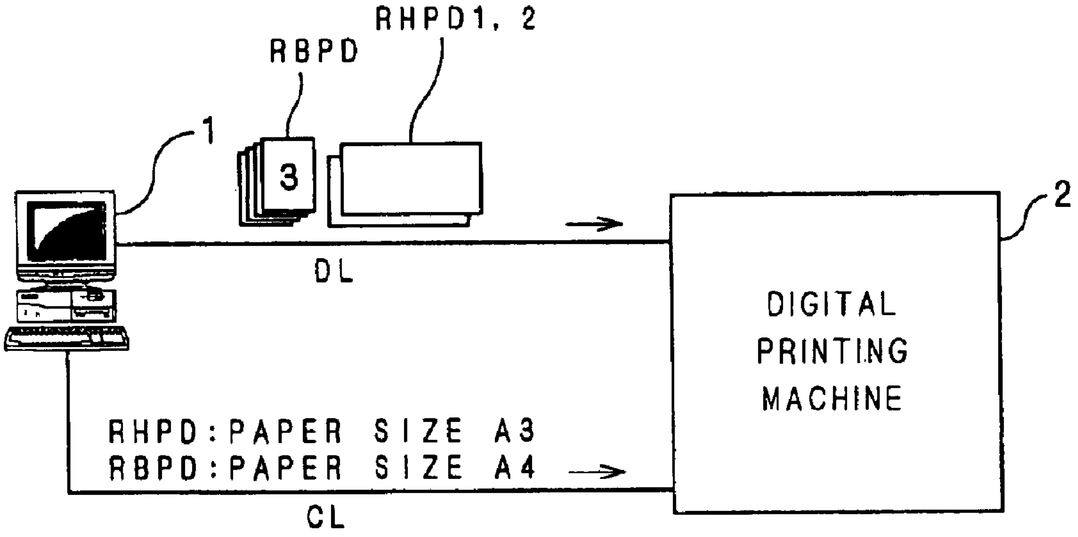
FIGS. 7A to 7B are drawings that explain a state in which front cover printing data RHPD and body printing data RBPD are outputted by printing data output element 177.

For example, in the case when printing data output element 177 outputs the front cover printing data RHPD and the body printing data RBPD to digital printing machine 2 while referring to print format information PSD shown in FIG. 5B, controller 1 outputs front cover printing data RHPD to digital printing machine 2 through communication line DL, as shown in FIG. 7A, and the body printing data RBPD is then successively outputted to digital printing machine 2 in the order of pages.

Here, with respect to the front cover printing data RHPD and the body printing data RBPD, since these have respectively different sizes of printing paper to be used, it is not possible to form printed sheets of paper having a format of a booklet even when the front cover printing data RHPD and the body printing data RBPD are successively outputted to digital printing machine 2. Therefore, referring to print format information PSD, printing data output element 177 controls digital printing machine 2 through communication line CL so as to execute printing processes using sheets of printing paper that respectively correspond to the front cover printing data RHPD and the body printing data RBPD.

Figure 7B:
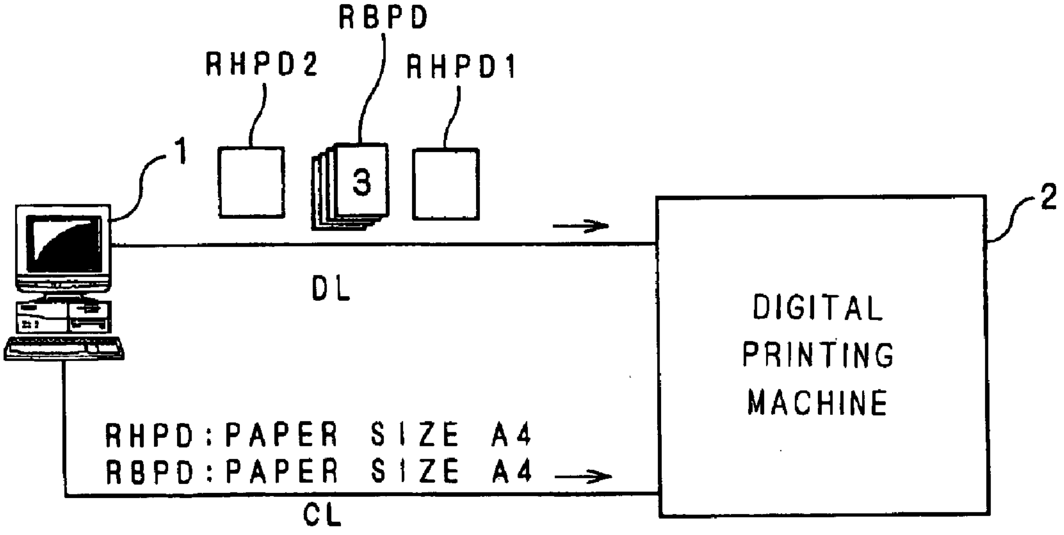

Moreover, in the case when the sequence skips step S5, that is, in the case when no glued-on cover bookbinding process is carried out, as shown in FIG. 7B, front cover printing data RHPD1, formed by page data PD1 and PD2, is outputted by controller 1 and the body printing data RBPD is successively outputted, and the front cover printing data RHPD2 consisting of page data PDn−1 and PDn are lastly outputted so as to place the front cover and rear cover on the leading portion and the final portion of a booklet.

Then, at step S8, digital printing machine 2 carries out a printing process on the print data including the front cover printing data RHPD and body printing data RBPD continuously inputted from printing data output element 177 so that sheets of printed paper to be supplied to an automatic bookbinding machine to form a booklet can be prepared.

In this manner, printing system 100, shown in FIG. 1, carries out an operation shown in a flowchart of FIG. 3 so that it is possible to achieve a printing system which can continuously supply printed sheets corresponding to the cover portion and the body portion to an automatic bookbinding machine.

<Second Preferred Embodiment>

The second preferred embodiment relates to a mode in which a different front cover is printed on a booklet basis so that it is possible to form variety of booklets. In other words, in printing system 100, cover page data HPD is altered to have different contents so that printed matters having respectively different printed images on the respective cover portions can be printed.

Figure 8:
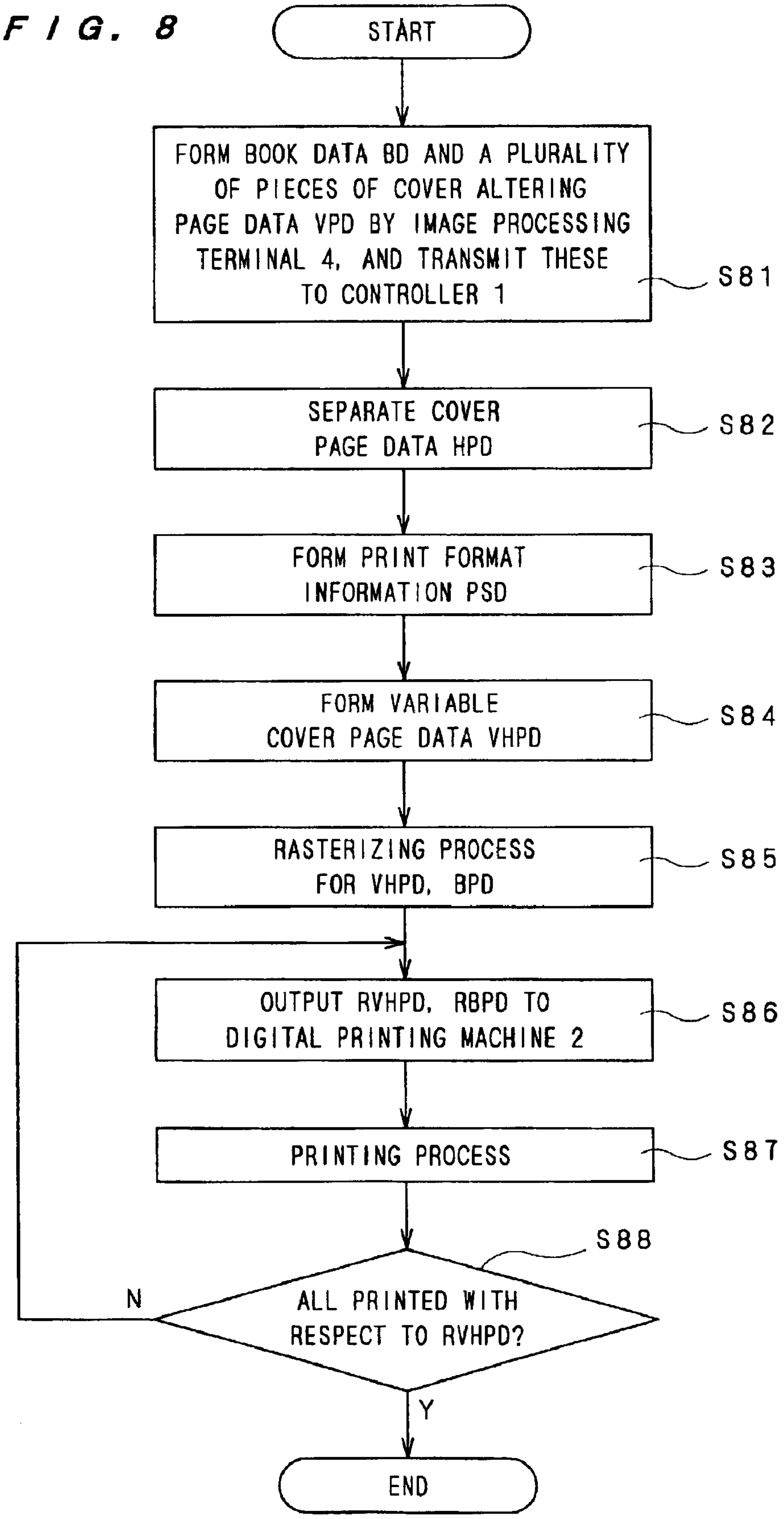
FIG. 8 is a flow chart that explains the operation of printing system 100 when the content of the cover portion is changed.

FIG. 8 is a flowchart that explains the operation for forming printed matters having respectively different printed images on the respective cover portions in printing system 100.

At step S81, the operator of image processing terminal 4 creates book data BD and front cover alteration page data VPD. Since the formation of book data BD is carried out in the same manner as step S1 of FIG. 3, the explanation there of is omitted. The front cover alteration page data VPD is data that relates to cover page data HPD separated from book data BD in a process which will be described later, and is used for altering the contents thereof. Here, the print image size, represented by front cover alteration page data VPD, needs to be set smaller than the print image size represented by data PD of a plurality of pages stored in book data BD. The operator of image processing terminal 4 forms m-pieces of front cover alteration page data VPD by operating application software, not shown, and transmits book data BD and book cover alteration page data VPD thus formed to controller 1 through network 3.

Controller 1 receives the book data BD and front cover alteration page data VPD through network I/F unit 14, and stores these in memory unit 16. At step S82, cover page data separating element 171 of controller 1 separates cover page data HPD from the book data BD. Since this step S82 is the same as step S2 of FIG. 3, the explanation thereof is omitted.

At step S83, print format setting element 174 carries out print format setting operations on cover page data HPD and body page data BPD respectively. In the same manner as step S3, the operator of controller 1 carries out print format setting operations on the cover page data HPD and the body page data BPD based upon print format setting menu MPS shown in FIG. 5A to form print format information PSD.

At this time, in order to carry out alteration settings on each of booklets so as to alter the contents of cover portion, inputs are given to cover page variable setting frame 53 in print format setting menu MPS.

Front cover page variable setting frame 53 is used for changing the contents of the cover page data HPD and for carrying out the resulting printing operation. When a content alteration of cover page is made in print format information PSD, page layout element 175 substitutes cover page data HPD with front cover altering page data VPD to form variable cover page data VHPD.

Front cover page variable setting frame 53 is provided with a non-alteration button 53*a*, an alteration button 53*b*, an altering portion specifying button 53*c* and front cover alteration page data name input frame 53*d*. When printed matters which have cover portions the contents of which are altered depending on booklets are desired, the operator of controller 1 operates input unit 13 so as to give inputs to cover page variable setting frame 53.

Non-alteration button 53*a* is pressed when a setting is made so that the contents of cover page data HPD are not altered. In the case when this non-alteration button 53*a* is pressed, even when front cover alteration page data VPD is prepared, no alteration of the contents of cover page data HPD is carried out.

Alteration button 53*b* is pressed when a setting is made so that the contents of cover page data HPD are changed. When this alteration button 53*b* is pressed, inputs to alteration unit specifying button 53*c* and front cover altering page data name input frame 53*d* are successively carried out so that print format settings that allow page layout element 175 to form variable cover page data VHPD are carried out.

Here, both of non-alteration button 53*a* and alteration button 53*b* are exclusively specified, and it is not possible to press both of them simultaneously.

Altering portion specifying button 53*c* is used for specifying the altering portion in cover portions. The cover portion includes four portions, that is, the outside of the front cover, the inside of the front cover, the outside of the rear cover and the inside of the rear cover, and altering portion specifying button 53*c* is provided with buttons corresponding to the above-mentioned portions. In order to specify a desired altering portion in the cover portion, the operator of controller 1 presses altering portion specifying buttons 53*c* corresponding to a desired altering portion so that settings of the altering portions on cover page data HPD are carried out.

Front cover altering page data name input frame 53*d* is used for specifying front cover altering page data VPD that alters the contents of cover page data HPD. By inputting the name of the front cover altering page data VPD used for altering the contents of cover portion to altering page data name input frame 53*d*, the front cover altering page VPD used for altering the cover page data HPD is set.

Here, a plurality of front cover alteration page data names may be inputted to front cover altering page data name input frame 53*d*. Thus, booklets, each having altered contents of the cover portion, the number of which corresponds to the number of the names of front cover alteration page data VPD, can be formed.

Format setting information PSD including inputs to cover page variable setting frame 53 has a construction as shown in FIG. 9. Different from format setting information PSD shown in FIG. 5B, format setting information PSD, shown in FIG. 9, has a setting, "presence", with respect to "cover page variation". Correspondingly, settings required for altering the contents of a cover portion are stored; that is, "the outside of the front cover" is stored with respect to "variable portions", and "VPD1 to VPDm" are stored with respect to "variable page name".

At step S84, referring to print format information PSD, page layout element 175 reads cover page data HPD from cover page data storing element 172, and also reads front cover altering page data VPD from memory unit 16 so that laid-out cover page data NHPD and variable cover page data VHPD corresponding to the altered contents of the cover portion are formed.

Here, laid-out cover page data NHPD is formed with respect to the rear cover on which the alteration of front cover altering page data VPD is not carried out. Here, with respect to the formation of laid-out cover page data NHPD, the process is the same as that shown in step S5, the explanation thereof is omitted.

Figure 10A:
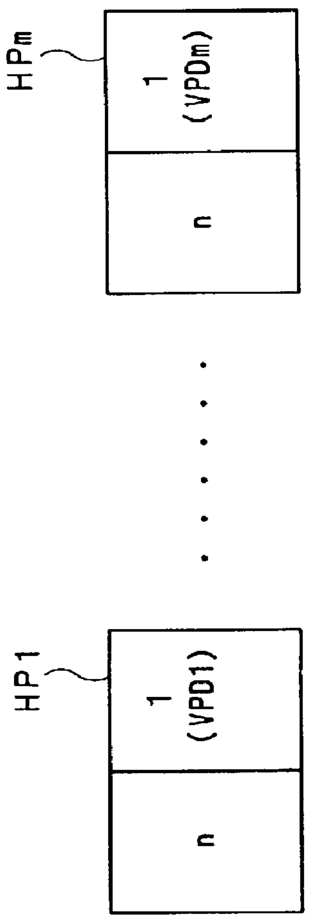
FIGS. 10A and 10B are drawings that explain a construction of variable cover page data VHPD.

FIG. 10A is a drawing that shows variable cover page data VHPD, formed by page layout element 175 by reference to print format information PSD, in which the contents of the outside of the front cover are changed. As shown in the Figure, pieces of variable cover page data VHPD the number of which corresponds to the number of pieces of front cover altering page data VPD stored in "variable page name" in print format information PSD of FIG. 9, are formed. In other words, with respect to print format information PSD, if m-number of pieces of front cover altering data VPD are stored in "variable page name", the number of variable cover page data VHPD is represented by m.

Figure 10B:
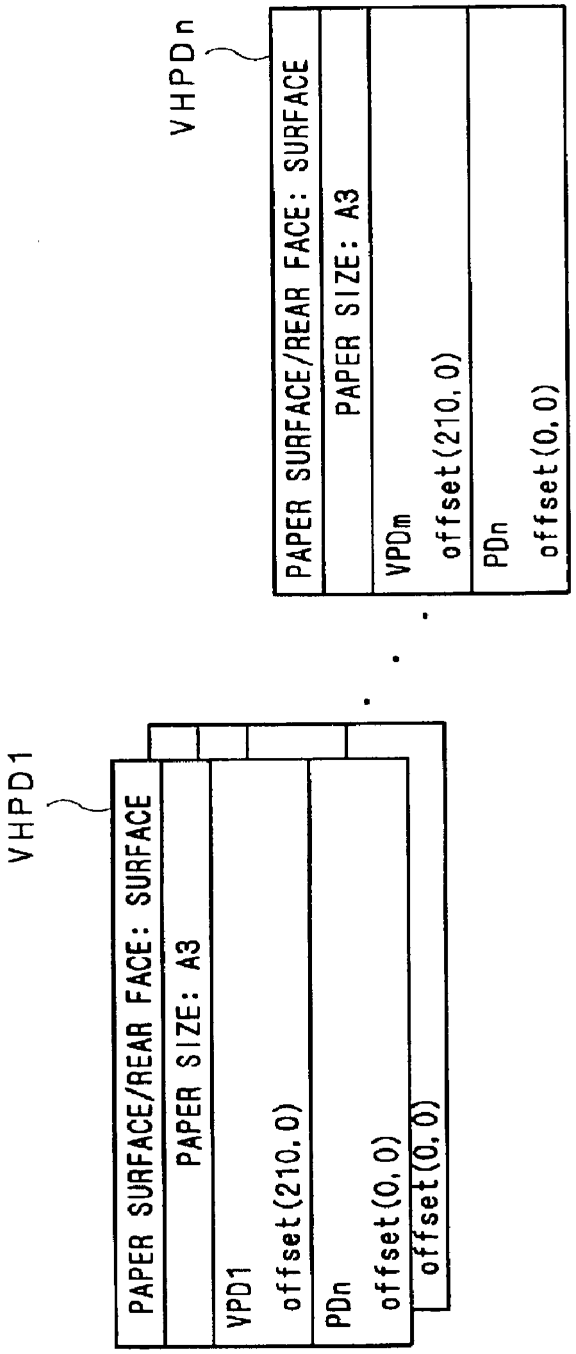

FIG. 10B is a drawing that explains a construction of variable cover page data VHPD1 formed by page layout element 175. FIG. 10B is similar to the construction of laid-out front page data NHPD1 in FIG. 6B. In other words, with respect to "paper surface and rear face", "surface" is stored since the printing process is carried out on the surface of front cover printing paper HP, and with respect to "paper size", "A3" is stored. This is because the body paper size is set to "A4" by the body format information, and the size of the front cover printing paper HP needs to be set to not less than twice the size thereof. Moreover, since page data PD corresponding to the first page of the surface of front cover printing paper HP is front cover altering page data VPD1 based upon format setting information PSD, "VPD1" and "PDn" are respectively stored, and "offset=(0, 210)" and "offset=(0,0)" are respectively added thereto as the layout positions of page data PD. Here, the left below apex of the front cover printing paper HP is set as the origin, and the left blow point from the apex of a print image of each piece of page data PD is determined as a layout position of page data PD.

Moreover, in print format information PSD, it is set that with respect to the outside of the front cover, a plurality of pieces of front cover altering page data VPD are used; therefore, with respect to page data PD corresponding to the first page of the surface of front cover printing paper HP, page layout element 175 forms a plurality of pieces of variable cover page data VHPD that respectively store front page altering page data VPD that are set in print format information PSD. Here, since the front cover altering page data VPD set in print format information PSD corresponds to m-number of VPD1 to VPDm, page layout element 175 forms m-number of pieces of data VHPD1 to VHPDm with respect to variable cover page data VHPD.

In this manner, a plurality of pieces of variable cover page data VHPD, formed by page layout element 175, is temporarily stored in memory unit 16.

Here, without directly storing front cover altering page data VPD in variable cover page data VHPD, variable cover page data VHPD may be associated with front cover altering page data VPD through link information.

At step S85 RIP element 176 carries out rasterizing processes on a plurality of pieces of variable cover page data VHPD and laid-out cover page data NHPD as well as body page data BPD so that a plurality of pieces of variable front cover printing data RVHPD, front cover printing data RHPD and body printing data RBPD are formed.

A plurality of piecies of variable front cover printing data RVHPD and front cover printing data RHPD as well as body printing data RBPD, formed in RIP element 176, are stored in memory unit 16.

At step S86, printing data output element 177 outputs the variable front cover printing data RVHPD, front cover printing data RHPD and body printing data RBPD to digital printing machine 2 through communication line DL. In this case, print data output element 177 successively outputs the variable front cover printing data RVHPD, front cover printing data RHPD and body printing data RBPD to digital printing machine 2, while referring to print format information PDS formed in print format setting element 174. Moreover, printing data output element 177 outputs print format information PSD to digital printing machine 2 through communication line CL so as to control digital printing machine 2.

Figure 11A:
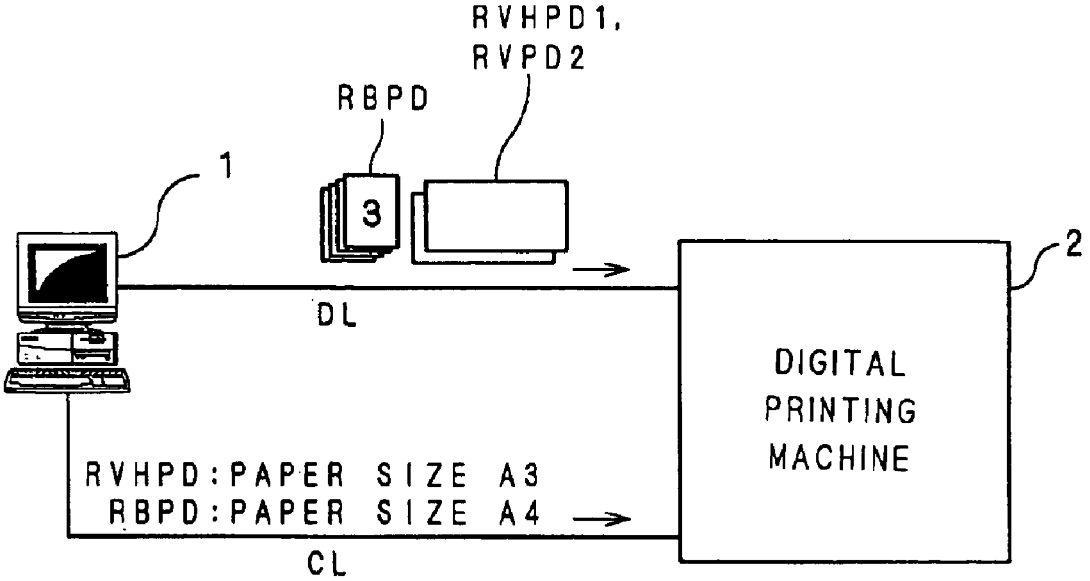
FIGS. 11A to 11B are drawings that explain a state in which printing data output element 177 outputs variable front cover printing data RVHPD and body printing data RBPD, and show the resulting booklet.

Printing data output element 177 continuously outputs the variable front cover printing data RVHPD, front cover printing data RHPD and body printing data RBPD so as to supply printed sheets having subjected to printing processes in digital printing machine 2 to an automatic bookbinding machine and to form booklets. For example, in the case when, referring to print format information PSD shown in FIG. 9, printing data output element 177 outputs the variable front cover printing data RVHPD, front cover printing data RHPD and body printing data RBPD to digital printing machine 2, as shown in FIG. 11A, controller 1 outputs variable front cover printing data RVHPD1 to digital printing machine 2 through communication line DL, front cover printing data RHPD is outputted to digital printing machine 2, and body printing data RBPD is outputted to digital printing machine 2 in the order of pages.

Here, since the variable front cover printing data RVHPD, front cover printing data RHPD and body printing data RBPD have respectively different sizes to be used, it is not possible to form printed sheets of paper having a format of a booklet even when the variable front cover printing data RVHPD, front cover printing data RHPD and body printing data RBPD are successively outputted to digital printing machine 2. Therefore, referring to print format information PSD, printing data output element 177 controls digital printing machine 2 through communication line CL so as to execute printing processes using sheets of printing paper that respectively correspond to the variable front cover printing data RVHPD, front cover printing data RHPD and body printing data RBPD.

Then, at step S87, digital printing machine 2 carries out a printing process on the variable front cover printing data RVHPD, front cover printing data RHPD and body printing data RBPD outputted from printing data output element 177 so that sheets of printed paper to be supplied to an automatic bookbinding machine to form a booklet can be prepared.

Figure 11B:
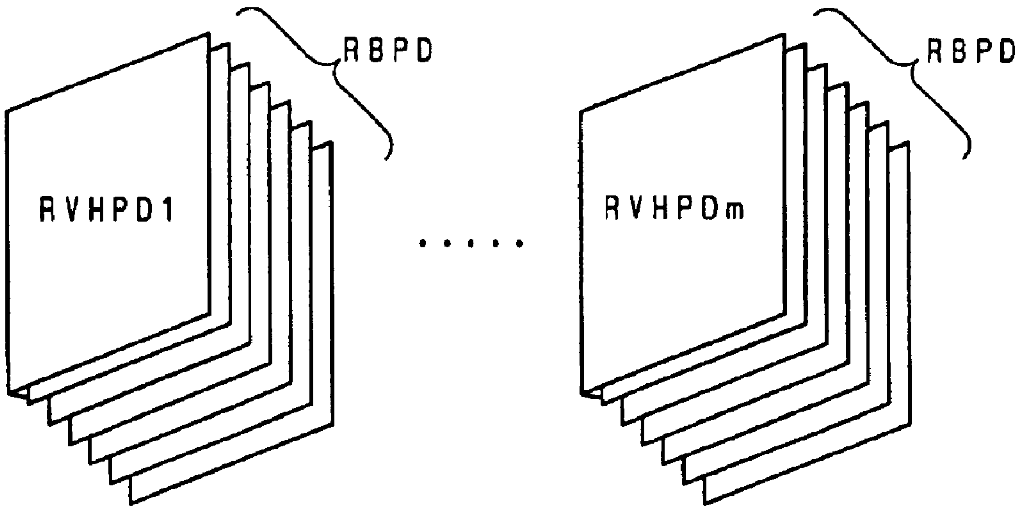

When, upon completion of the printing process at step S87, the respective printing processes of a plurality of variable front cover printing data RVHPD have not been completed, the sequence returns to step S86, and the printing process using the next variable front cover printing data RVHPD, front cover printing data RHPD and body printing data RBPD is repeated. In this case, with respect to the front cover printing data RHPD and body printing data RBPD, the same printing processes as the previous printing process is carried out; however, with respect to the variable front cover printing data RVHPD, not RVHPD1 but RVHPD2 is outputted to digital printing machine 2, and subjected to a printing process by digital printing machine 2. As a result, as shown in FIG. 11B, a plurality of booklets having different contents only on the outside of the front cover are formed.

In this manner, printing system 100 shown in FIG. 1 is allowed to carry out operations shown in a flowchart in FIG. 8 so that it is possible to achieve a printing system which can continuously supply printed sheets corresponding to a cover portion and a body portion with a flexibility in its representation in the cover portion, to an automatic bookbinding machine.

<Third Preferred Embodiment>

Figure 12:
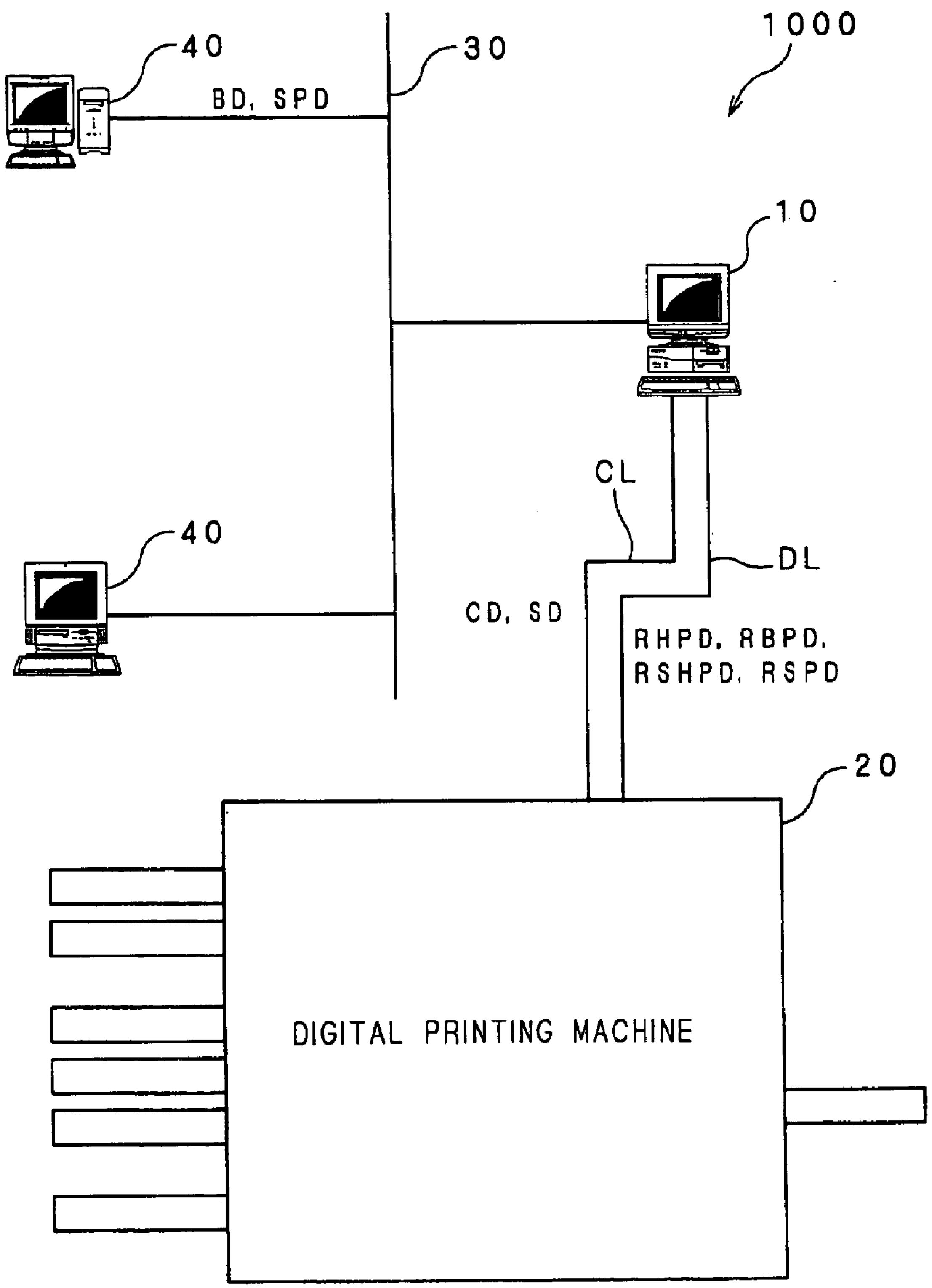
FIG. 12 is a drawing that explains a construction of a printing system 1000.

The third preferred embodiment of the present invention makes it possible to form a booklet with a front cover and a back cover. FIG. 12 is a drawing that shows a construction of a printing system 1000 that relates to another preferred embodiment of the present invention.

This printing system 1000 is constituted by a controller 10, a digital printing machine 20 and an image-processing terminal 40, and controller 10 and image-processing terminal 40 are connected by a network 30. Moreover, controller 10 and digital printing machine 20 are connected by a communication line CL and a communication line DL.

In order to form a booklet consisting of a plurality of pages, image processing terminal 40 makes book data BD in which data of a plurality of pages PD is stored, and back cover page data SPD that forms a back cover. The operator of image processing terminal 40 adds pieces of page data PD that respectively form a front cover and a rear cover to the leading portion of book data BD and the last portion thereof; however, with respect to back cover page data SPD, this data is formed in a separated manner from book data BD. Back cover page data SPD is formed as data in a page description language format by utilizing application software, not shown, in the same manner as book data BD.

Image processing terminal 40 transmits book data BD and back cover page data SPD to controller 10 through network 30.

Moreover, image processing terminal 40 may store back cover page data SPD in book data BD. The back cover page data SPD, stored in book data BD, is separated from book data BD by using a back cover page data forming element 1074, which will be described later.

Controller 10 receives book data BD and back cover page data SPD, formed in image processing terminal 40, through network 30. Controller 10 carries out rasterizing processes on the book data BD and back cover page data SPD that have been received. As a result, a plurality of pieces of page data PD stored in book data BD are converted to a plurality of pieces of printing page data RPD that represent a print image. Moreover, the back cover page data SPD is also converted to printing back cover data RSPD that represents a print image. Controller 1 transmits there plurality of pieces of printing page data RPD and printing back cover data RSPD to digital printing machine 20 connected thereto through communication line DL.

Here, the construction of digital printing machine 20 is the same as digital printing machine 2 shown in FIG. 1; therefore, the description thereof is omitted.

Figure 13:
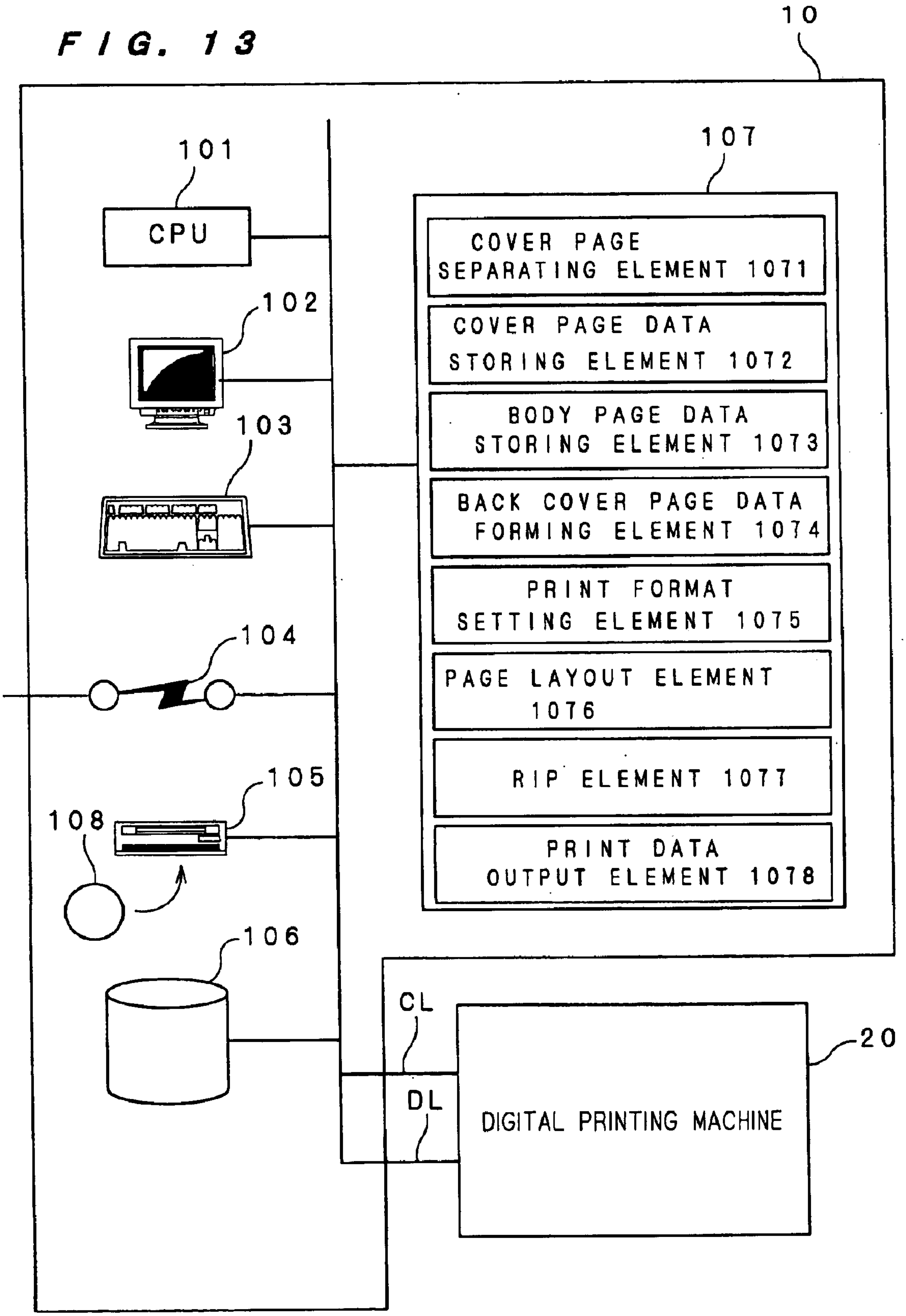
FIG. 13 is a drawing that explains a construction of controller 10.

FIG. 13 is a drawing that shows a construction of controller 10. Controller 10 is a generally-used personal computer, and constituted by a CPU 101, a display unit 102, an input unit 103, a network I/F 104, a media drive 105, a memory unit 106, a memory 107, and communication lines CL and DL.

Here, with respect to the constructions of CPU 101, display unit 102, input unit 103 and communication lines CL and DL, these are the same as those devices of controller 1 shown in FIG. 2; therefore, the description thereof is omitted.

Network I/F 104 is used for connecting controller 10 and network 30. Controller 10 receives book data BD and back cover page data SPD from image processing terminal 40 connected to network 30 through network I/F 104. Moreover, from a server not shown, a program for achieving functions of controller 10 may be downloaded. Here, in the case when digital printing machine 20 is connected to controller 10 through network 30, the printing page data RPD and back cover printing data RSPD as well as control signal CD are transmitted and the status signal SD transmitted from digital printing machine 20 is received, through network I/F 104. Media drive 105 is used for reading programs recorded in media disk 108. The programs read from media drive 105 achieve functions of controller 10. Moreover, in the case when controller 10 is operated in an off-line state from image processing terminal 40, the book data BD and back cover page data SPD, formed in image processing terminal 40, are recorded in media disk 108, and the successive processes may be carried out by allowing this media drive 105 to read the above-mentioned media disk 108. Memory unit 106 stores a program that has been read by media drive 105. Furthermore, memory unit 106 also stores book data BD, front cover printing data RHSPD with back cover, body printing data RBPD and back cover page data SPD as well as back cover printing data RSPD.

Memory 107 provides a work area in which the programs stored in memory unit 106 are executed by CPU 101. As a result of execution of the programs by CPU 101, the functions of the following units are achieved in memory 107: cover page data separating element 1071, cover page data storing element 1072, body page data storing element 1073, back cover data forming element 1074, print format setting element 1075, page layout element 1076, RIP element 1077 and print data output element 1078.

Here, the functions of cover page data separating element 1071, cover page data storing element 1072, body page data storing element 1073 and RIP element 1077 are the same as those of controller 1 of FIG. 2, the explanations thereof are omitted.

In the case when back cover page data SPD is stored in book data BD, back cover page data forming element 1074 is used for extracting and storing back cover bock data SPD from the book data BD.

Moreover, back cover page data forming element 1074 also have functions for extracting character information stored in cover page data HPD to create back cover page data SPD. Back cover page data forming element 1074 extracts character information such as document titles, sentence names, file names or document structures, contained in cover page data HPD stored in cover page data storing element 1072. Back cover page data forming element 1074 uses the above-mentioned character information to newly form back cover page data SPD.

Print format setting element 1075 is used for setting print formats with respect to cover page data HPD and body page data BPD as well as back cover page data SPD. In a booklet, the cover portion, body portion and back cover portion are always different in print formats. Moreover, in the case when a glued-on cover bookbinding process is carried out, since the back cover is sandwiched between the front cover and rear cover, the cover page data HPD and the back cover page data SPD need to be composed. Therefore, print format setting element 1075 respectively sets a desirable print format for the cover portion with respect to cover page data HPD, a desirable print format for the body portion with respect to the body page data BPD and a desirable print format for the back cover with respect to the rear cover page data SPD so that print format information PSD is formed. With this arrangement, when a printing process is carried out by digital printing machine 20, which will be described later, printing processes, which are respectively suitable for the cover portion and the body portion, are continuously carried out.

Based upon the print format information PSD formed in print format setting element 1075, page layout element 1076 carries out a re-layout of cover page data HPD. In the case when a front cover print format for carrying out a glued-on cover bookbinding process is set in print format setting element 1075, a cover portion, formed by printing a front cover and a rear cover as well as back cover on one sheet of printing paper, is required. In order to form such a cover portion, page layout element 1076 reads out cover page data HPD from cover page data storing element 1072, and reads out back cover page data SPD stored in memory unit 106 so that cover page data HSPD with back cover on which cover page data HPD and rear cover page data SPD are placed is formed so as to achieve a mode of front cover set by print format information PSD.

Moreover, in the case when alteration in the contents in cover page is made in print format information PSD, page layout element 1076 substitutes cover page data HPD by using front cover altering page data VPD to form a plurality of variable cover page data VHPD.

Print data output element 1078 is used for outputting front cover printing data with back cover RHSPD and body printing data RBPD, formed in RIP element 1077, to digital printing machine 20. In the case when printed sheets are supplied to an automatic bookbinding machine to carry out a bookbinding process, it is not possible to carry out the bookbinding process unless the cover portion and body portion are successively supplied. Therefore, print data outputting element 1078 successively outputs the front cover printing data with back cover RHSPD and body printing data RBPD to digital printing machine 20 through communication line DL. Moreover, printing data output element 1078 also outputs print format information PSD respectively set in cover page data with back cover HSPD and body page data BPD by print format setting element 1075 is outputted to digital printing machine 20 through communication line CL. With this arrangement, in digital printing machine 20, in the case when the front cover printing data with back cover RHSPD is printed, the print format set for the cover page data with back cover HSPD is used, and in the case when the body printing data RBPD is printed, the print format set for the body page data BPD is used; thus, the respective printing processes are carried out so that printed sheets to be supplied to an automatic bookbinding machine are prepared.

Figure 14:
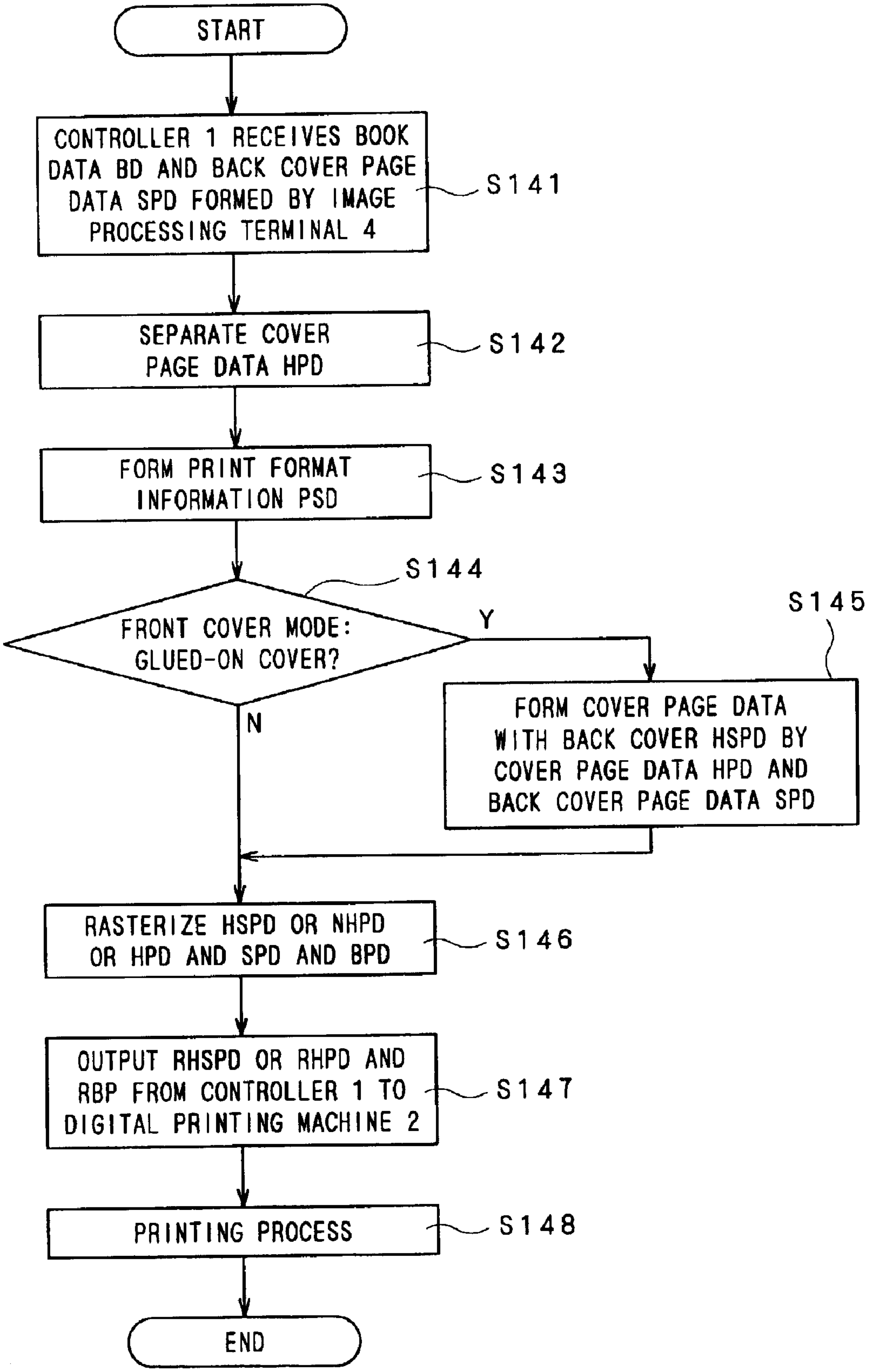
FIG. 14 is a flow chart that explains the operation of printing system 1000.

FIG. 14 is a flow chart that explains the operation of printing system 1000.

At step S141, image processing terminal 40 forms book data BD containing a plurality of pieces of page data PD so as to form a booklet and back cover page data SPD and, and transmits these to controller 10. The operator of image processing terminal 40 forms n-pieces of page data PD that represent respective pages of the booklet by operating application software not shown, and forms book data BD that constitute one booklet by combining the respective pieces of page data PD. Moreover, the operator of image processing terminal 40 operates application software in the same manner to form back cover page data SPD that constitutes a cover portion.

Here, back cover page data SPD is used for forming a printed sheet that forms a back cover of the booklet. Normally, the height of a print image derived from the back cover page data SPD is equal to the height of print image derived from page data PD, but the width thereof is comparatively shorter than the width of print image of page data PD. Therefore, since the back cover page data SPD is different from page data PD, normally, it is not stored in book data BD.

The operator of image processing terminal 40 transmits the book data BD and back cover page data SPD thus formed to controller 10 through network 30.

Controller 10 receives the book data BD and back cover page data SPD through network I/F unit 104, and stores these in memory unit 106.

With respect to step S142, the same processes as step S2 of FIG. 3 are carried out; therefore, the explanation thereof will be omitted.

Figures 15A, 15B:
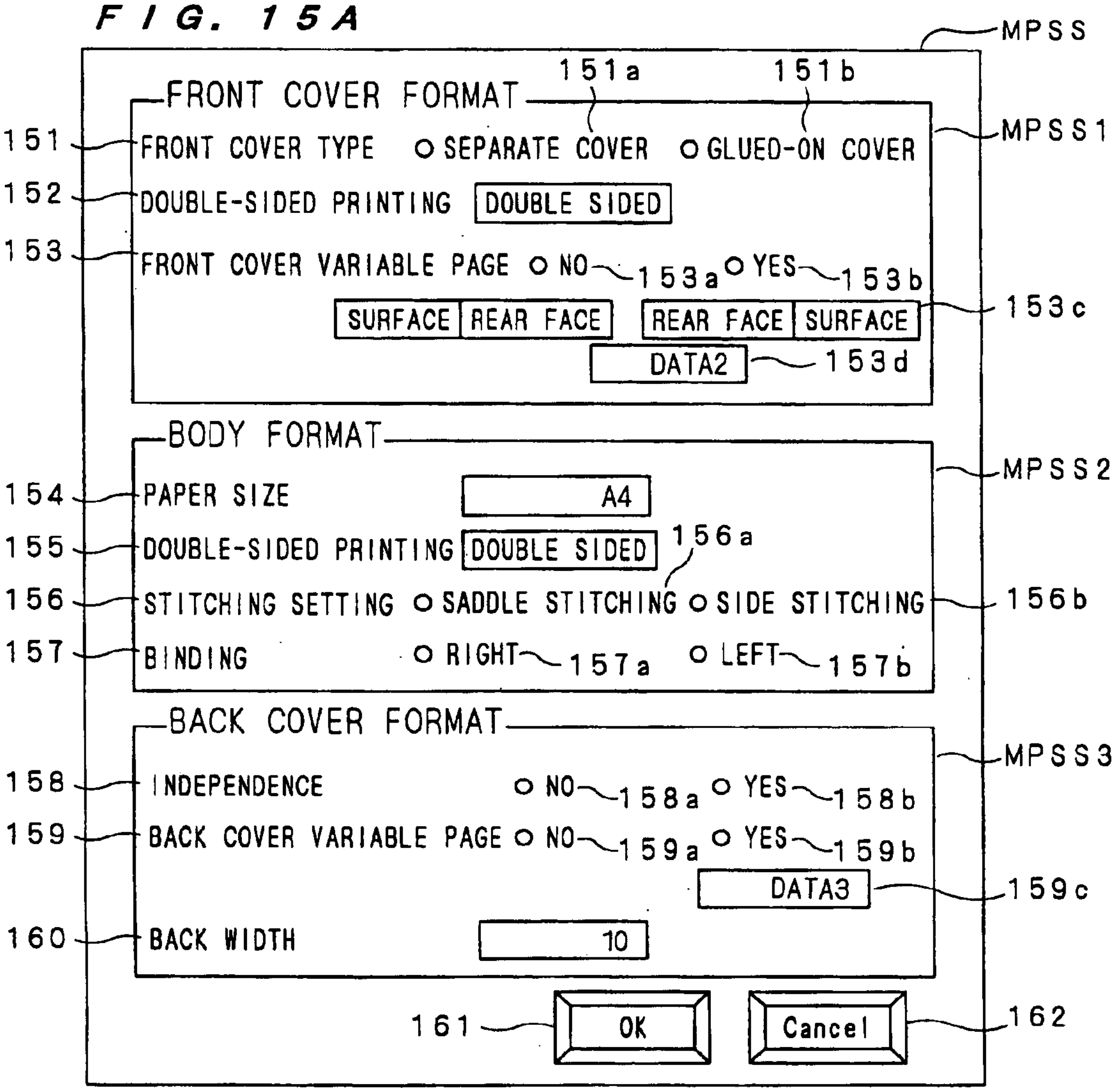
FIGS. 15A and 15B are drawings that explain a print format setting menu MPSS and a construction of print format information PSD.

At step S143, print format setting element 1075 sets print formats with respect to cover page data HPD and body page data BPD as well as back cover page data SPD. FIG. 15A shows print format setting menu MPSS displayed on display unit 102 by print format setting element 1075 so as to allow the operator of controller 10 to set print formats for the cover page data HPD and body page data BPD as well as back cover page data SPD.

Print format setting menu MPSS is provided with a front cover format setting frame MPSS1 and a body format setting frame MPSS2 and a back cover format setting frame MPSS3.

Front cover format setting frame MPSS1 is provided with a front cover type input frame 151, a double-sided printing execution display frame 152 and a cover page variable setting frame 153.

Moreover, body format setting frame MPSS2 is provided with a paper size setting frame 154, a double-sided printing setting frame 155, a stitching setting frame 156 and a binding direction setting frame 157.

Furthermore, back cover format setting frame MPSS3 is provided with a back cover independent setting frame 158, a back cover page variable setting frame 159 and a back-width setting frame 160.

Print format setting menu MPSS is provided with an OK button 161 and a cancel button 162.

Here, front cover format setting frame MPSS1 and body format setting frame MPSS2 are the same as front cover format setting frame MPS1 and body format setting frame MPS2 of FIG. 5A; therefore, the description thereof is omitted.

Back cover independent setting frame 158, provided in back cover print format setting frame MPSS3, is used for determining whether or not laid-out cover page data NHPD formed by cover page data HPD should be combined with back cover page data SPD. In not only a case in which front cover and rear cover are printed on respectively single sheets of paper, but also a case in which front cover is used for a glued-on bookbinding process, a back cover is desirably printed on a sheet of paper, and subjected to a book-binding process. In order to prepare such a setting, back cover independent setting frame 158 is provided with an independent non-setting button 158*a* and an independent setting button 158*b*. When the operator of controller 10 operates input unit 103 to press independent non-setting button 158*a*, page layout element 1076 forms cover page data with back cover HSPD by combining back cover page data SPD with laid-out cover page data NHPD. When the operator of controller 10 presses independent setting button 158*b*, back cover page data SPD is set in its format so as to be independently printed on a single sheet.

Here, independent non-setting button 158*a* and independent setting button 158*b* are exclusively specified, and the two buttons can not be pressed simultaneously. Moreover, in the case when "separate cover" is set in "front cover type", since laid-out cover page data NHPD with which back cover page data SPD is combined is not formed, print format setting element 1075 may controls independent non-setting button 158*a* so as not to be pressed.

Back cover page variable setting frame 159 is used when a setting is preferably made so as to change the contents of back cover page. In the same manner as the alteration of the contents of cover portion explained in "the second preferred embodiment", when the contents of back cover are altered, the operator of controller 10 operates input unit 103 so as to give inputs through back cover page variable setting frame 159; thus, a format setting is made so as to alter the contents of back cover.

Therefore, back cover page variable setting frame 159 is provided with a non-alteration button 159*a*, an alteration button 159*b*, a back cover alteration page-data-name input frame 159*c*.

Non-alteration button 159*a* is pressed to make a setting in which the contents of back cover page data SPD are not altered. In the case when this non-alteration button 159*a* is pressed, even if there is data to alter the contents of back cover, no alteration in the contents of back cover page data SPD is made.

Alteration button 159*b* is pressed to make a setting in which the contents of back cover page data SPD are altered. In the case when this alteration button 159*b* is pressed, by successively giving inputs through back cover alteration page-data-name input frame 159*c*, a print format setting operation is carried out so as to form variable back cover page data VSPD by using page layout element 175.

Here, non-alteration button 159*a* and alteration button 159*b* are exclusively specified, and these buttons can not be pressed simultaneously.

Back cover alteration page-data-name input frame 159*c* is used for specifying a data name that is subjected to alteration in back cover page data SPD. By inputting a name of data used for altering the contents of the back cover portion to the back cover alteration page-data-name input frame 159*c*, a setting of the back cover alteration page VSPD used for altering the back cover page data SPD is carried out. A plurality of data names can be inputted to back cover alteration page-data-name input frame 159*c*. Thus, it is possible to form booklets in which the contents of back cover portions are altered and the number of which corresponds to the number of pieces of back cover alteration page data VSPD.

Here, with respect to the alteration of the contents of back cover portion, since virtually the same processes as the alteration of the contents of cover portion are carried out, the description thereof is omitted.

Back width setting frame 160 is used for setting the width of a back cover when, in particular, cover page data with back cover HSPD is formed. When the operator of controller 10 inputs a desired numeric value to base width setting frame 160 as the back width, the layout position of cover page data HPD in cover page data with back cover HSPD is determined based upon the numeric value.

Moreover, the display width of back cover page data SPD corresponds to a numeric value set in this back width setting frame 160. In other words, independent of the width of print image of back cover page data SPD as it is, the width of the print image of back cover page data SPD in print image in cover page data with back cover HSPD is represented by the width set in back width setting frame 160.

The unit of the numeric value in back width setting frame 160 may be set as a desired unit system, such as Q, millimeter and pixel. In this case, it is supposed that the back width is set by millimeter (mm).

After inputs have been given to front cover print format setting frame MPSS1 and body print format frame MPSS2 as well as back cover print format setting frame MPSS3 respectively, the operator of controller 10 presses OK button 161, thereby completing the inputs in print format setting menu MPSS. Based upon the contents of the inputs given to print format setting menu MPSS, print format setting element 1075 forms print format information PSD. When an attempt is made to terminate the setting of print format in the middle of the operation, cancel button 162 is pressed, thereby completing print format setting menu MPSS.

FIG. 15B shows the construction of print format information PSD formed by print format setting element 1075. The respective items of front cover format information and body format information are the same as those shown in FIG. 5B; however, the print format information PSD formed by print format setting element 1075 is different in that it includes an item for back cover format information.

As for back cover format information, settings that have been made in back cover print format setting frame MPSS3 are stored with respect to "back cover independence" and "back cover page variable" as well as "back width". Here, suppose that "non-independence" is set with respect to "back cover independence", "none (–)" is set with respect to "back cover page variable" and "10 (mm)" is set with respect to "back width".

Print format information PSD, thus formed, is used as control information for controlling digital printing machine 20 in steps as will be described later.

At step S144, when "glued-on cover" is set as the "front cover type" in the front cover print format, the sequence proceeds to step S145. When "separate cover" is set as the "front cover type", the sequence proceeds to step S146.

At step S145, in order to form a front cover for glued-on cover bookbinding, page layout element 1076 reads cover page data HPD from cover page data storing element 1072 and reads back cover page data SPD stored in memory unit 16. Then, referring to the front cover format information and back cover format information formed at step S143 and stored in print format information PSD, it lays page data PD and back cover page data SPD constituting cover page data HPD on a printing sheet so that cover page data with back cover HSPD is formed.

Figures 16A, 16B, 16C:
FIGS. 16A to 16C are drawings that explain a construction of cover page data HSPD with a back cover sheet.

FIG. 16 is a drawing that explains the formation of cover page data with back cover HSPD by page layout element 1076 that is carried out while referring to front cover format information and back cover format information. In order to form a front cover print sheet HP as shown in FIG. 16A, based upon front cover format information and back cover format information in print format information PSD shown in FIG. 15B, page layout element 1076 forms cover page data with back cover HSPD as shown in FIGS. 16B and 16C.

FIG. 16B is a drawing that explains the construction of cover page data with back cover HSPD1 to be used for printing the surface of front cover printing paper HP. Cover page data with back cover HSPD1 includes information relating to "paper surface or rear face", "paper size" and cover page data HPD and back cover page data SPD to be placed. Here, with respect to the "paper surface or rear face", "paper surface" is stored since the printing is carried out on the surface of front cover printing paper HP, and with respect to "paper size", the body paper size "A4" is set by body format information, and with respect to the size of front cover printing paper HP, since the paper size not less than twice the above-mentioned size is required, "A3" is stored. Moreover, with respect to cover page data HPD to be placed, since page data PD1 corresponding to the first page and PDn corresponding to n-th page are placed on the surface of front cover printing paper HP, "PD1" and "PDn" are respectively stored.

In this case, with respect to the layout position of page data PD, "offset=(215, 0)" and "offset=(0,0)" are added thereto. Here, the reason that the layout position of page data PD1 is different from that of laid-out cover page data NHPD1 of FIG. 6B is because cover page data with back cover NHPD1, which is combined with back cover page data SPD, is susceptible to its influence with respect to the layout position of page data PD1.

Moreover, with respect to cover page data with back cover HSPD, back cover page data SPD is also stored. The layout position of back cover page data SPD is determined by a width formed by using a point that equally divides front cover printing paper HP as a base point, based upon the setting of "back width" formed at step S143 and stored in format setting information SPD. In this case, the setting of "back width" is "10 (mm)" and the point that equally divides front cover printing paper HP is set to (210, 0); therefore, the position occupied by a print image of cover page data PSD ranges from (205, 0) to (215, 297) so that "offset=(205, 0)" is added as its layout position.

In this manner, the layout positions of page data PD and back cover page data SPD are determined with the left below apex of front cover printing paper HP serving as the origin.

In the same manner, FIG. 16C is a drawing that explains the construction of cover page data with back cover HSPD2 used for printing the rear face of front cover printing paper HP, and with respect to the "paper surface or rear face", "rear face" is stored, and with respect to "paper size", "A3" is set, and with respect to cover page data HPD to be placed, "PD2" and "PDn−1" are stored with the respective page layout positions "offset=(0, 0) and "offset=(215, 0) being added thereto.

Here, with respect to cover page data with back cover HSPD2 in which back cover page data PSD is not included, the reason that the layout positions of page data PD2 and PDn−1 are different from those of laid-out cover page data NHPD2 of FIG. 6B is because provision is made so as to deal with the alteration of the layout positions of page data PD1 and PDn due to the fact that back cover page data PSD is included in cover page data with back cover HSPD1.

The cover page data with back cover HSPD formed by page layout element 1076 in this manner is temporarily stored in storing unit 106.

Without directly storing cover page data HPD and back cover page data SPD in cover page data with back cover HSPD, cover page data with back cover HSPD may be made associated with cover page data HPD and back cover page data SPD through link information.

At step S146, RIP element 1077 carries out rasterizing processes on cover page data HPD and back cover page data SPD or cover page data with back cover HSPD as well as body page data BPD. Consequently, front cover printing data RHPD or front cover printing data with back cover RHSPD and body printing data RBPD, which have a binary bit-map format that can be printed by digital printing machine 20, are formed. Moreover, in the case when back cover page data SPD is printed on printing paper independently, back cover printing data RSPD is also formed.

Front cover printing data RHPD or front cover printing data with back cover RHSPD and body printing data RBPD, and/or back cover printing data RSPD, formed in RIP element 176, are stored in memory unit 106.

At step S147, a printing data output element 1078 outputs the front cover printing data RHPD or front cover printing data with back cover RHSPD and body printing data RBPD, and/or back cover printing data SPD to digital printing machine 20 through communication line DL. In this case, referring to print format information PSD formed in print format setting element 1075, printing data output element 1078 successively outputs the front cover printing data RHPD or front cover printing data with back cover RHSPD and body printing data RBD, and/or back cover printing data RSPD to digital printing machine 20. Moreover, printing data output element 1078 outputs print format information PSD to digital printing machine 20 so as to control digital printing machine 20, through communication line CL.

Figure 17A:
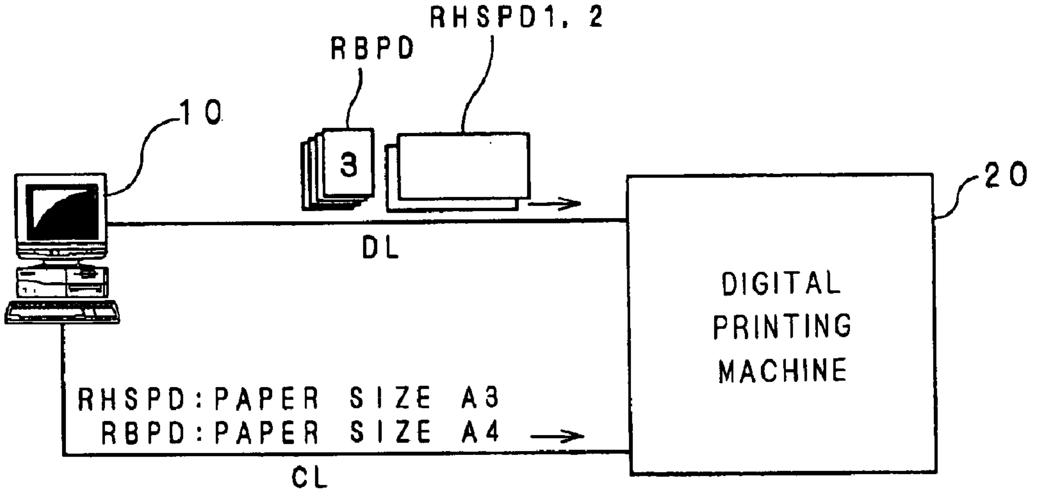
FIGS. 17A and 17B are drawings that explain a state in which a printing data output element 1078 outputs cover page data RHSPD with a back cover and body printing data RBPD.

For example, in the case when printing data output element 1078 outputs the front cover printing data with back cover RHSPD and the body printing data RBPD to digital printing machine 20 while referring to print format information PSD shown in FIG. 15B, controller 10 outputs front cover printing data with back cover RHSPD to digital printing machine 20 through communication line DL, as shown in FIG. 17A, and the body printing data RBPD is then successively outputted to digital printing machine 20 in the order of pages.

Figure 17B:
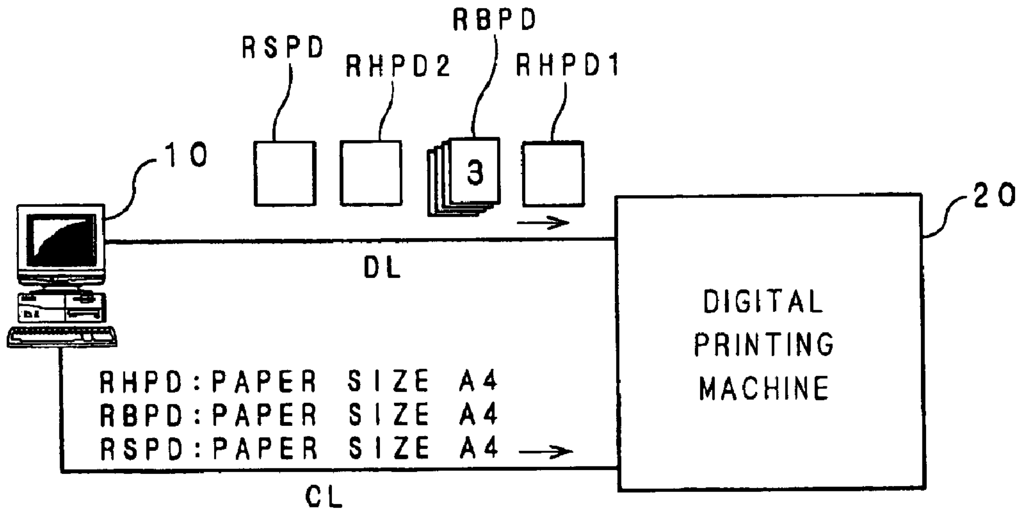

Moreover, in the case when the sequence skips step S145, that is, in the case when no glued-on cover bookbinding process is carried out, as shown in FIG. 17B, front cover printing data RHPD1, formed by page data PD1 and PD2, is outputted by controller 1, and the body printing data RBPD is successively outputted, and the front cover printing data RHPD2 consisting of page data PDn−1 and PDn are lastly outputted so as to place the front cover and rear cover on the leading portion and the final portion of a booklet, and back cover printing data RSPD is further outputted.

Here, with respect to back cover printing data RSPD, this is printed on printing paper having the same size as body printing data RBPD, and cut and added to the back cover of the booklet. Alternatively, printing paper used for printing back cover may be housed in digital printing machine 20, and a back cover format setting may be made so as to be printed with the corresponding paper size.

Then, at step S148, digital printing machine 20 carries out printing processes on the front cover printing data RHPD or front cover printing data with back cover RHSPD and body printing data RBPD, and/or back cover printing data RSPD, outputted from printing data output element 1078, so that printed sheets of paper, which can be supplied to an automatic bookbinding machine to form a booklet, are prepared.

Figure 18:
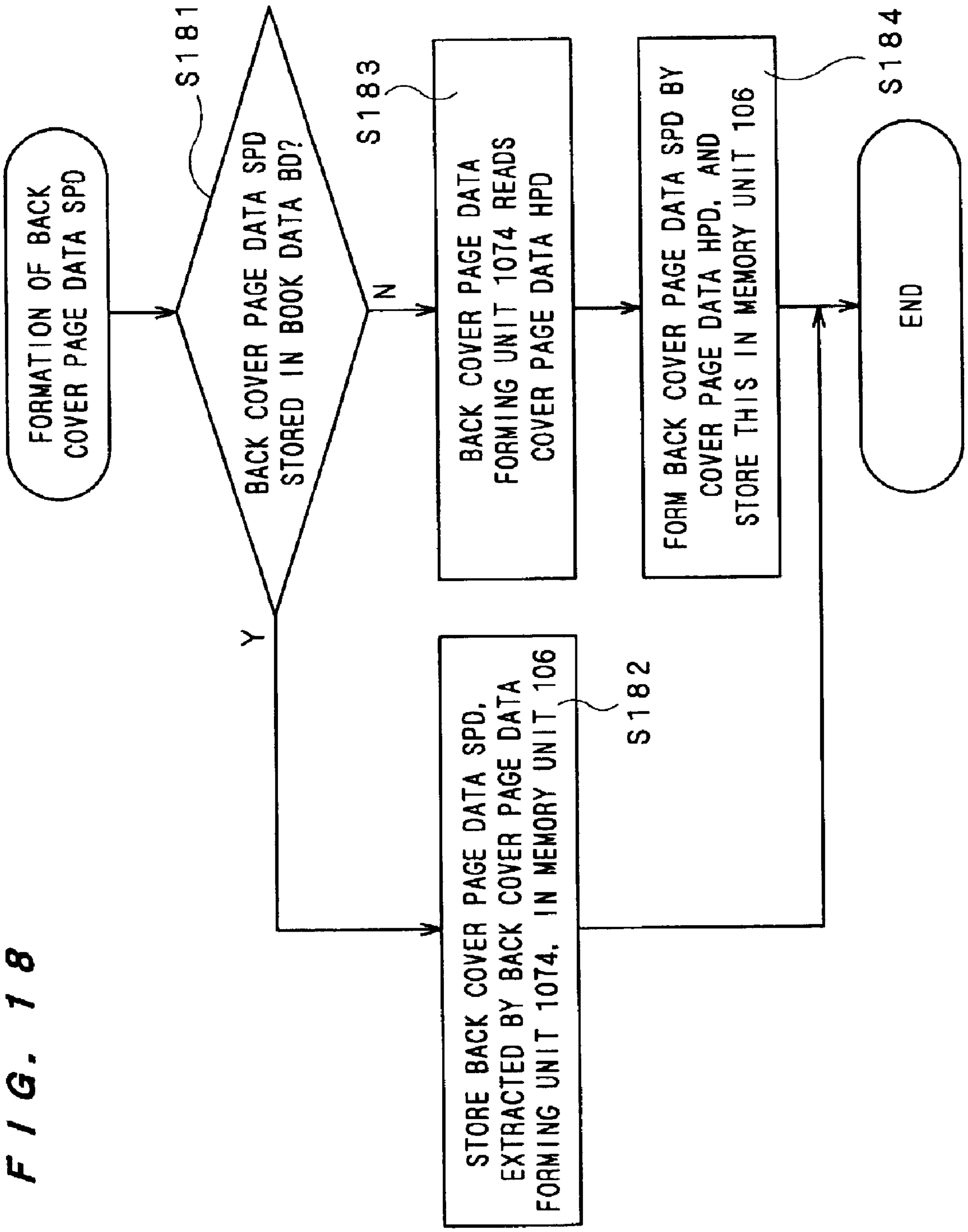
FIG. 18 is a flow chart that explains the operation in which back cover page data formation element 1074 forms back cover page data SPD.

Moreover, in the case when back cover page data SPD is stored in book data BD, or in the case when back cover page data SPD is formed by using cover page data HPD, an operation, shown in a flowchart in FIG. 18, is carried out by controller 10 after the processes of step S142 shown in a flowchart of FIG. 14.

In step S181 shown in FIG. 18, the operator of controller 10 determines whether or not back cover page data SPD is stored in book data BD. Since back cover page data forming element 1074 shows the contents of book data BD on display unit 102, the operator confirms the contents of book data BD. When back cover page data SPD is stored in book data BD, the operator uses input unit 103 to select the back cover page data SPD. In response to this, the sequence proceeds to step S182 so that back cover page data forming element 1074 extracts the back cover page data SPD.

When back cover page data SPD is not stored in book data BD, the sequence proceeds to step S183 to form new back cover page data SPD.

At step S182, based upon the selection by the operator at step S181, back cover page data forming element 1074 extracts back cover page data SPD from book data BD. The back cover page data SPD, thus extracted, is stored in memory unit 106.

Here, in the case when back cover page data SPD is stored in book data BD, the processes from step S181 to step S182 may be automatically carried out by back cover page data forming element 1074. With respect to the automatic extracting method of back cover page data SPD, for example, since the page sizes of page data BPD and back cover page data SPD are different as described earlier, back cover page data forming element 1074 extracts all the page data PD having different page sizes from page data PD stored in book data BD, and among the extracted page data PD, the page data PD related to the minimum page size may be determined as back cover page data SPD, and stored in memory unit 106.

The flow of processes from step S183 relates to processes in which since back cover page data SPD is not stored in book data BD, back cover page data SPD is formed by back cover page data forming element 1074.

At step S183, back cover page data forming element 1074 reads cover page data HPD stored in cover page data storing element 1072 at step S142 shown in FIG. 14. In order to form back cover page data SPD from character information such as document titles and chapter names, file names or document structures of book data BD, back cover page data forming element 1074 reads cover page data HPD as page data PD that is more likely to contain such character information. Because of the reason as described earlier, cover page data HPD to be read by back cover page data forming element 1074 is preferably set as page data PD1 corresponding to the first page.

At step S184, back cover page data forming element 1074 forms back cover page data SPD based upon cover page data HPD read at step S183.

Figures 19A, 19B:
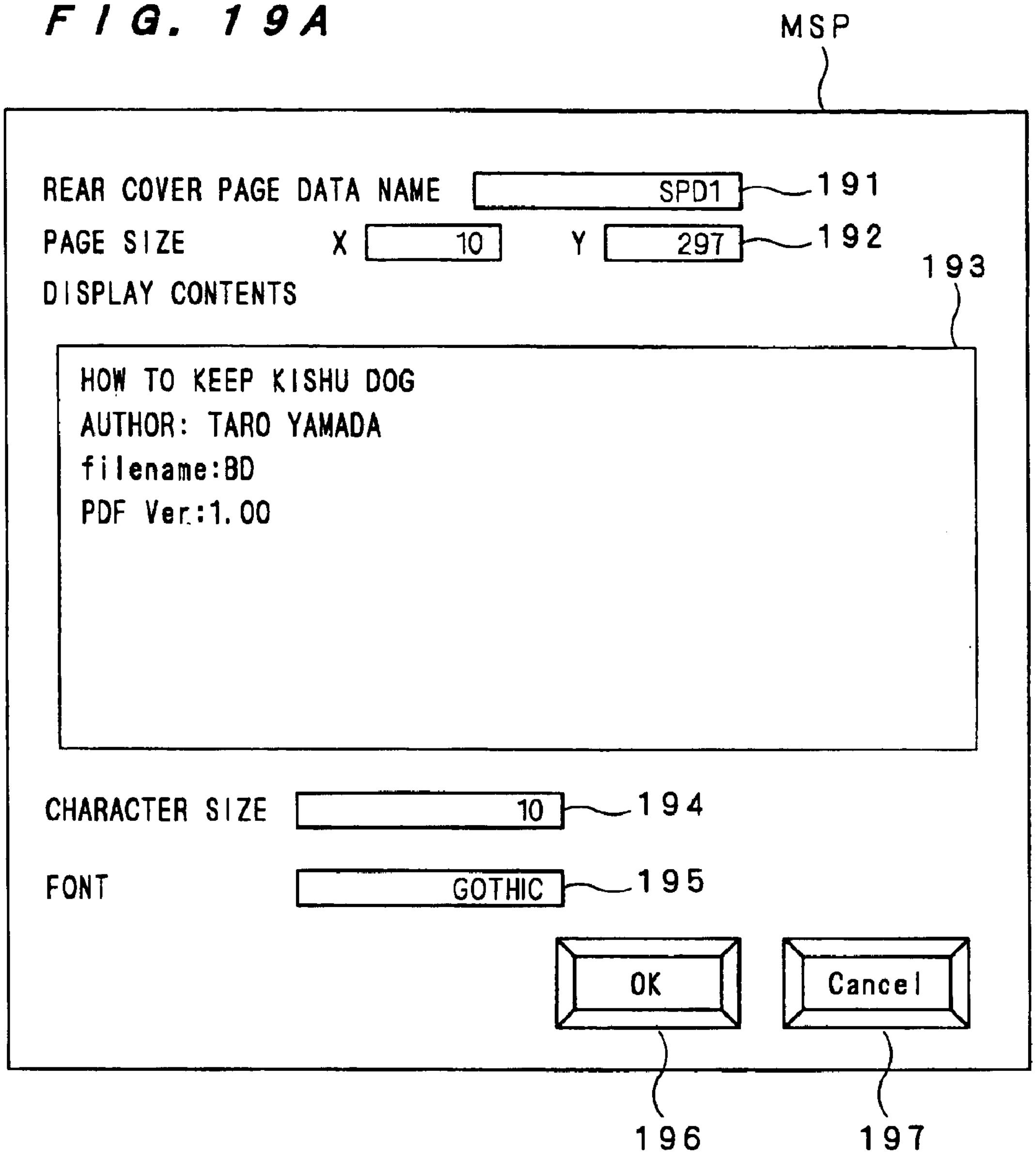
FIGS. 19A to 19B are drawings that explain a construction of a back cover page data formation menu MSP and a construction of back cover page data SPD.

FIG. 19A explains a back cover page data forming menu MSP that is displayed on display unit 102 displayed by back cover page data forming element 1074 so as to form back cover page data. The operator of controller 10 uses input unit 103 to give inputs to back cover page data forming menu MSP so that back cover page data forming element 1074 forms back cover page data SPD.

Therefore, back cover page data forming menu MSP is provided with a back cover page data name input frame 191, a page size input frame 192, a display content specifying frame 193, a character size input frame 194, a font specifying frame 195, an OK button 196 and a cancel button 197.

Back cover page data name input frame 191 is used for inputting a name of back cover page data SPD to be formed. The operator inputs a desired name to this back cover page data name input frame 191 with respect to back cover page data SPD to be formed, thereby determining the name thereof.

Page size input frame 192 is used for inputting the page size of back cover page data SPD. With respect to the page size of back cover page data SPD, it is different from that of normal page data PD due to the inherent features derived from the back cover; therefore, the page size is specified in a different manner. For this reason, the operator inputs a desired page size into page size input frame 192 so that back cover page data forming element 1074 is allowed to form back cover page data SPD with the corresponding page size.

Here, in the case when a booklet has a lateral binding direction, since the height of the back cover is equal to the height of the booklet, the size in the y-axis direction in back cover page data SPD is also equal to the size of cover page data HPD. Therefore, in accordance with the binding direction of the booklet, back cover page data forming element 1074 may use the size in the x-axis direction or y-axis direction of cover page data HPD with respect to the size in the x-axis direction or y-axis direction of back cover page date SPD.

Display content specifying frame 193 is used for displaying character information stored in cover page data HPD so as to allow the operator to specify character information to be displayed on the back cover. In display content specifying frame 193, character information, such as document titles and chapter names, file names or document structures of book data BD, read by back cover page data forming element 1074 and stored in cover page data, is displayed. When the operator specifies desired character information to be put on the back cover from the character information displayed in display content specifying frame 193, back cover page data forming element 1074 forms back cover page data SPD so as to make the specified character information displayed on the back cover.

Character size input frame 194 is used for inputting the size of characters to be displayed on the back cover. Based on the character size inputted in character size input frame 194 by the operator, back cover page data forming element 1074 forms back cover page data SPD so as to display the character information specified in display content specifying frame 193 on the back cover.

Here, with respect to the character size, any desired unit such as millimeter, point and Q (1Q is defined as about 0.25 mm), may be used.

Character font specifying frame 195 is used for specifying the character font to be displayed on back cover. Back cover page data forming element 1074 forms back cover page data SPD so as to display the character information specified in display content specifying frame 193 on the back cover, by using the character font inputted in character front specifying frame 195 by the operator.

Upon completion of all the inputs to back cover page data forming menu MSP, the operator presses OK button 196. Consequently, based upon the results of the inputs given to back cover page data forming menu MSP, back cover page data forming element 1074 forms back cover page data SPD. Moreover, when an attempt is made to terminate the formation of back cover page data SPD, the operator may presses cancel button 197.

As a result of the inputs to back cover page data forming menu MSP, back cover page data forming element 1074 forms back cover page data SPD having a construction as shown in FIG. 19B.

In this case, supposing that, with respect to the inputs given to back cover page data forming menu MSP, "SPD1" is given as the back cover page data name, "x=10 mm, y=297 mm" is given as the page size, "how to keep "Kishu dog"" is given as character information, "10 mm" is given as the character size and "Gothic type" is given as the font, back cover data is formed.

The back cover page data SPD, formed at step S184 in this manner, is stored in memory unit 106.

The back cover page data SPD, formed based upon the flowchart shown in FIG. 18, can be used in the printing process by controller 10 in the same manner as the back cover page data SPD formed through image processing terminal 40. Therefore, even when no back cover page data exists in the initial stage, controller 10 can form a booklet with a proper appearance.

In this manner, printing system 1000 shown in FIG. 12 carries out an operation shown in the flowchart in FIG. 14 so that it is possible to achieve a printing system which can continuously supply sheets of printed paper corresponding to the cover portion and the body portion to a bookbinding machine.

<Modified Examples>

In the above explanations, the first, second and third preferred embodiments are discussed as different examples; however, these may be formed into a combined system.

The binding direction is not limited to the lateral direction and may be set to the longitudinal direction.

Furthermore, in digital printing machines 2 and 20, instead of being directly supplied to an automatic bookbinding machine, sheets of printed paper corresponding to the cover portion and the body portion formed as front cover printing data RHPD and body printing data RBPD may be respectively stored on different stackers so as to prepare for the succeeding bookbinding processes.

While the invention has been shown and described in detail, the foregoing description is in all aspects illustrative and not restrictive. It is understood that numerous modifications and variations can be devised without departing from the scope of the invention.

What is claimed is:

1. A printing system comprising:

a) a printing device capable to contain sheets of printing paper of different kinds; and b) a controller for controlling said printing device, comprising:

cover page data separating means for separating cover page data from book data, wherein a print image of a cover portion is derived form said cover page data said cover portion including a front cover and a rear cover of a booklet, back cover page data generating means for generating back cover page data by extracting character information included in said cover page data, page data storing means for storing said cover page data and body page data, wherein a print image of a body portion of the booklet is derived form said body page data, said body page data being the rest of said book data after separation of said cover page data, said page data storing means further storing said back cover page data, wherein a print image of a back cover portion of the booklet is derived from said back cover page data;

print-format setting means for setting respective print formats for said cover page data and body page data and back cover page data, and output means for continuously outputting print data including said cover page data, body page data, and back cover page data to said printing device in accordance with said respective print formats, said output means comprising control means for controlling an output sequence of said cover page data, said body page data and said body page data in said print data in accordance with said respective print formats, wherein said printing device comprises:

printing means for continuously inputting said print data from said controller to print said cover portion, said body portion and back cover portion of the booklet in accordance with said respective printing formats on the sheets of printing paper of different kinds.

2. The printing system according to claim 1, wherein said controller further comprises:

page content changing means for changing contents of cover page data and/or back cover page data stored in said page data storing means while substantially maintaining contents of said body page data.

3. The printing system according to claim 1, wherein said different print formats includes a print format for said back cover data, and said print-format setting means further sets a print format for said back cover page data, and said printing means is operable to print said cover portion, said body portion and said back cover portion of the booklet in accordance with said respective printing formats for said cover page data, said page data and said back cover data on the sheets of printing paper of different kinds.

4. The printing system according to claim 1, wherein said cover page data includes i) a cover page data from which a print image of the front cover is derived, and ii) a rear cover page data from which a print image of the rear cover is derived, and said controller further comprises:

page layout means for obtaining laid-out complex page data on which said page data i) and ii) together with said back cover page data are arranged on a single page plane, when said print format setting means sets a printing layout in which said page data i) and ii) together with said back cover page data are to be printed on a single sheet of printing paper.

5. A controller of a printing system for controlling a printing device capable to contain sheets of printing paper of different kinds, said controller comprising:

cover page data separating means for separating cover page data from book data, wherein a print image of a cover portion is derived from said cover page data, said cover portion including a front cover and a rear cover of a booklet;

back cover page data generating means for generating back cover page data by extracting character information included in said cover pane data;

page data storing means for storing said cover page data and body page data, wherein a print image of a body portion of the booklet is derived from said body page data, said body page data being the rest of said book data after separation of said cover page data, said page data storing means further storing said back cover page data, wherein a print image of a back cover portion of the booklet is derived from said back cover page data;

print-format setting means for setting respective print formats for said cover page data and body page data and back cover page data; and output means for continuously outputting print data including said cover page data, body page data, and back cover page data to said printing device in accordance with said respective print formats, said output means comprising control means for controlling an output sequence of said cover page data, said body page data and said body page data in said print data in accordance with said respective print formats.

6. A method of printing page images using a printing device capable to contain sheets of printing paper of different kinds, said method comprising the steps of:

separating cover page data from book data wherein a print image of a cover portion is derived from said cover page data, said cover portion including a front cover and a rear cover of a booklet, generating back cover page data by extracting character information included in said cover page data, obtaining said cover page data and body page data, wherein a print image of a body portion of the booklet is derived from said body page data, said body page data being the rest of said book data after separation of said cover page data, obtaining said back cover page data, wherein a print image of a back cover portion of the booklet is derived from said back cover page data;

setting respective print formats for said cover page data, body page data and back cover page data; and continuously outputting print data including said cover page data, body page data and back cover page data to said printing device in accordance with said respective print formats, and operating said printing device to continuously input said print data from said controller to print said cover portion, said body portion and back cover portion of the booklet in accordance with said respective printing formats on the sheets of printing paper of different kinds.

7. A program which is installed in a computer, to allow said computer to operate as a controller for controlling a printing device capable to contain sheets of printing paper of different kinds, said controller comprises:

cover page data separating means for separating cover page data from book data, wherein a print image of a cover portion is derived from said cover page data, said cover portion including a front cover and a rear cover of a booklet;

back cover page data generating means for generating back cover page data by extracting character information included in said cover page data;

page data storing means for storing said cover page data and body page data wherein a print image of a body portion of the booklet is derived from said body page data, said body page data being the rest of said book data after separation of said cover page data, said page data storing means further storing said back cover page data, wherein a print image of a back cover portion of the booklet is derived from said back cover page data;

print-format setting means for setting respective print formats for said cover page data, body page data and back cover page data; and output means for continuously outputting print data including said cover page data, body page data, and back cover page data to said printing device in accordance with said respective print formats, said output means comprising control means for controlling an output sequence of said cover page data, said body page data and said body page data in said print data in accordance with said respective print formats.

8. A recording medium on which computer program is recorded, said program allowing a computer to operate as a controller for controlling a printing device capable to contain sheets of printing paper of different kinds, said controller comprises:

cover page data separating means for separating cover page data from book data, wherein a print image of a cover portion is derived from said cover page data, said cover portion including a front cover and a rear cover of a booklet;

back cover page data generating means for generating back cover page data by extracting character information included in said cover page data;

page data storing means for storing said cover page data and body page data, wherein a print image of a body portion of the booklet is derived from said body page data, said body page data being the rest of said book data after separation of said cover page data, said page data storing means further storing said back cover page data, wherein a print image of a back cover portion of the booklet is derived from said back cover page data;

print-format setting means for setting respective print formats for said cover page data, body page data and back cover page data; and output means for continuously outputting print data including said cover page data, body page data, and back cover page data to said printing device in accordance with said respective print formats, said output means comprising control means for controlling an output sequence of said cover page data, said body page data and said body page data in said print data in accordance with said respective print formats.

* * * * *